US008181192B2

(12) United States Patent
Ezawa et al.

(10) Patent No.: US 8,181,192 B2
(45) Date of Patent: May 15, 2012

(54) DISK APPARATUS AND DISK DRIVE UNIT INCLUDING A LOCK MECHANISM THAT IS RELEASED ONLY WHEN THE DISPLAY UNIT IS IN A CLOSED STATE

(75) Inventors: Kozo Ezawa, Osaka (JP); Masahiro Inata, Hyogo (JP); Teruyuki Takizawa, Osaka (JP); Hironori Tomita, Nara (JP)

(73) Assignee: Panasonic Corporation, Osaka (JP)

( * ) Notice: Subject to any disclaimer, the term of this patent is extended or adjusted under 35 U.S.C. 154(b) by 1042 days.

(21) Appl. No.: 12/117,566

(22) Filed: May 8, 2008

(65) Prior Publication Data

US 2008/0282276 A1   Nov. 13, 2008

(30) Foreign Application Priority Data

May 8, 2007   (JP) ................................. 2007-123187

(51) Int. Cl.
*G11B 17/032* (2006.01)
*G11B 33/02* (2006.01)
(52) U.S. Cl. .......................... 720/655; 720/646; 720/657
(58) Field of Classification Search .. 361/679.26–679.3, 361/679.33–79.39, 679.55–679.58; 720/600, 720/601, 606, 610, 612, 626, 637, 639, 646, 720/647, 652–655, 657
See application file for complete search history.

(56) References Cited

U.S. PATENT DOCUMENTS

| | | | | |
|---|---|---|---|---|
| RE36,381 E | * | 11/1999 | Boyle et al. ............... | 361/679.41 |
| 6,044,473 A | * | 3/2000 | Kim .............................. | 713/320 |
| 7,151,676 B2 | * | 12/2006 | Suzuki ........................... | 361/801 |
| 2005/0041380 A1 | * | 2/2005 | Jeong ............................ | 361/681 |
| 2005/0268314 A1 | * | 12/2005 | Dai ................................ | 720/657 |
| 2006/0053430 A1 | * | 3/2006 | Zhang et al. ................. | 720/655 |
| 2007/0019374 A1 | | 1/2007 | Springer et al. | |
| 2008/0055843 A1 | | 3/2008 | Ke et al. | |

FOREIGN PATENT DOCUMENTS

| | | |
|---|---|---|
| JP | 8-235718 | 9/1996 |
| JP | 10-49254 | 2/1998 |

OTHER PUBLICATIONS

European Search Report issued Sep. 22, 2010 in Application No. EP 08 15 5878.

* cited by examiner

*Primary Examiner* — Nathan Danielsen
(74) *Attorney, Agent, or Firm* — Wenderoth, Lind & Ponack, L.L.P.

(57) ABSTRACT

A disk apparatus includes: an apparatus body including a disk drive portion for housing a disk medium having an information recording surface and for recording and/or reproducing information; and a lid body including a display for displaying information, and closed and opened with respect to the apparatus body in such a way that the display is postured face down and up. The apparatus body further includes: a drive-portion cover which is movable in a bottom direction of the apparatus body and inserts and ejects the disk medium into and from the disk drive portion; and a lock hook and a cover hook locking the disk medium housed in the apparatus body. A locking state of the lock hook and the cover hook is kept when the lid body is in the open state with respect to the apparatus body.

11 Claims, 24 Drawing Sheets

DISK APPARATUS AND DISK DRIVE UNIT INCLUDING A LOCK MECHANISM THAT IS RELEASED ONLY WHEN THE DISPLAY UNIT IS IN A CLOSED STATE

BACKGROUND OF THE INVENTION

1. Field of the Invention

The present invention relates to a disk apparatus including a disk drive capable of recording and/or reproducing information using a disk-shaped information recording medium such as an optical disk and a magnetic disk. It also relates to a disk drive unit used in this disk apparatus. For example, it relates to a console-type disk apparatus such as a potable terminal which can be carried by a user and a disk drive unit used in this disk apparatus.

2. Description of the Background Art

Various disk units for making a recording and/or a reproduction for a disk-shaped information recording medium, and disk media used in such units, have already been popular on a global scale. Those include: an optical disk unit for a CD (compact disk), a DVD (digital versatile disk), a BD (blu-ray disk) or the like; a magneto-optical disk unit for an MO (magneto-optical disk), an MD (mini-disk) or the like; and a recording-reproduction magnetic disk unit for an FD (floppy (registered trademark) disk) or the like. Especially, potable disk units mainly like potable MDs have recently become widespread remarkably on the market. A configuration of this type of disk unit is disclosed, for example, in Japanese Patent Laid-Open Publication No. 8-235718.

FIGS. 36 and 37 are each a side view showing a configuration of such a disk unit. FIG. 36 shows a disk-medium insertion hole opened in such a way that a disk medium (not shown) can be inserted or ejected. FIG. 37 shows the closed disk-medium insertion hole.

In FIGS. 36 and 37, reference numeral 106 denotes a unit body including a drive portion for making a recording and/or a reproduction for a disk medium; 101, a lid body covering the unit body 106; 102, a housing portion housing a disk medium added to the lid body 101; 105, a swing shaft for holding the lid body 101 on the unit body 106 in such a way that it can swing; 107 and 108, a hook portion and a slider for keeping the lid body 101 closed on the unit body 106, respectively; 112, a slider operation portion for moving the slider 108 in the direction of an arrow D101A; 114, a stopper added to the slider 108 and hooked by the hook portion 107 when the lid body 101 is closed; 115, a forcing spring for forcing the slider 108 in the direction of an arrow D101B; and 126, an opening spring for giving a force in the opening direction of an arrow D102.

When a user conducts recording and/or reproduction for a disk medium in this disk unit, the user inserts a disk medium in the direction of an arrow D103 into the open lid body 101 of FIG. 36. Then, the user closes the lid body 101 in the direction of an arrow D104 against the force of the opening spring 126 in the direction of the arrow D102.

Immediately before the lid body 101 is closed, the hook portion 107 presses the stopper 114 against the force of the forcing spring 115 and moves it temporarily in the direction of the arrow D101A. When it is completely closed, the force of the forcing spring 115 moves it back in the direction of the arrow D101B and the hook portion 107 hooks and locks the stopper 114. Hence, the lid body 101 is kept closed as shown in FIG. 37.

If the user moves the slider operation portion 112 in the direction of the arrow D101A from the closed state of FIG. 37, the hook portion 107 is unhooked from the stopper 114.

Thereby, the lid body 101 is given a force in the direction of the arrow D102 by the force of the opening spring 126. As a result, it is opened and comes again into the open state of FIG. 36, so that the user can take out the disk medium easily.

A disk unit has recently been provided with various functions and an interface has also advanced, including a display panel for a touch-pen input, in order for a user to recognize a variety of information such as information on a disk medium and information on an operation of such a unit. Particularly, a display panel such as a liquid crystal has been increasingly popular. A configuration of this type of portable terminal is disclosed, for example, in Japanese Patent Laid-Open Publication No. 10-49254.

FIG. 38 is a perspective view showing a configuration of such a portable terminal. Reference numeral 211 designates a unit body; 212, an operation panel united to the unit body 212 for operating the terminal; 215, a terminal lid supported so as to open and close on the unit body 211; 213, a display panel; 216 and 217, a hooking member and a hooked member for keeping and locking the lid 215 closed on the unit body 211, respectively; 214, an unhooking portion protruding from the unit body 211 and united with the hooked member 217.

If a user pushes in the unhooking portion 214 in this portable terminal, the hooking member 216 is unhooked and unlocked from the hooked member 217. This terminal is provided with a built-in changeover switch (not shown) making a changeover when the lid 215 opens and closes. Thereby, the user can operate the display panel 213 and all the other functions when the lid 215 is open. In contrast, when the lid 215 is closed with respect to the unit body 211, this terminal is in a standby state or a power-off state where many functions are restricted including a display function of the display panel 213. This is because the terminal is portable thus requiring the saving of energy.

In addition, such a portable terminal has recently had more and more functions. Thus, it should desirably be provided with various interfaces and capable of conducting recording or reproduction for diverse media. As one form, a disk unit as a complex unit (not shown) can be considered which is a combination of the disk unit shown in FIGS. 36 and 37 and the portable terminal shown in FIG. 38.

This complex unit is capable of conducting recording or reproduction for disk media using the operation panel 212 and displaying information on disk media, for example, on the display panel 213. It is also capable of inserting and ejecting a disk medium through a suitable operation for a portable terminal.

However, such a complex unit has the following problem, though it is easily operable. A user can move the slider operation portion 112 in the direction of the arrow D101A and eject a disk medium even while the unit is making a recording or a reproduction for the disk medium. Hence, the disk medium may be ejected while rotating and hit a member or the like around it accidentally thus damaging the disk medium itself. Further, its turning force can cause the disk medium to fly out.

If the disk medium is an optical disk, a laser is employed for recording and reproduction. Thus, the lid body 101 may be opened while the laser is emitting a beam. This can cause the laser beam to irradiate the eyes of the user.

SUMMARY OF THE INVENTION

It is an object of the present invention to provide a disk apparatus and a disk drive unit which are capable of preventing a disk-shaped information recording medium from flying out accidentally while the apparatus is in operation.

A disk apparatus according to an aspect of the present invention includes: a body unit including a disk drive for housing a disk-shaped information recording medium having an information recording surface and for recording and/or reproducing information; and a display unit including a display surface for displaying information, and closed and opened with respect to the body unit in such a way that the display surface is postured face down and up, in which: the body unit includes a disk insertion-and-ejection mechanism which is movable in a bottom direction of the body unit and inserts and ejects the information recording medium into and from the disk drive, and a lock mechanism locking the information recording medium housed in the body unit; and a locking state of the lock mechanism is maintained when the display unit is in the open state with respect to the body unit.

A disk drive unit according to another aspect of the present invention which is used in a disk apparatus including a body unit, and a display unit having a display surface for displaying information and closed and opened with respect to the body unit in such a way that the display surface is postured face down and up, includes: a disk drive for housing a disk-shaped information recording medium having an information recording surface and recording and/or reproducing information; and a disk insertion-and-ejection mechanism which: is disposed on a bottom-surface side of the body unit opposite to a surface thereof on which the display unit is disposed; is movable in a bottom direction of the body unit; and inserts and ejects the information recording medium into and from the disk drive, in which a hooking portion of the display unit interlocks with an opening operation of the display unit and hooks a hooked portion of the disk insertion-and-ejection mechanism to thereby prohibit the disk insertion-and-ejection mechanism from opening, and the hooking portion of the display unit interlocks with a closing operation of the display unit and unhooks the hooked portion of the disk insertion-and-ejection mechanism to thereby permit the disk insertion-and-ejection mechanism to open.

According to the above described configuration, a disk-shaped information recording medium can be prevented from flying out accidentally while the apparatus is in operation.

These and other objects, features and advantages of the present invention will become more apparent upon reading of the following detailed description along with the accompanied drawings.

DESCRIPTION OF THE PREFERRED EMBODIMENTS

Embodiments of the present invention will be below described with reference to the drawings.

(First Embodiment)

First, a description will be given of a disk apparatus according to a first embodiment of the present invention. To begin with, a configuration of the whole disk apparatus will be described with reference to FIGS. 1 to 5.

Figure 1:
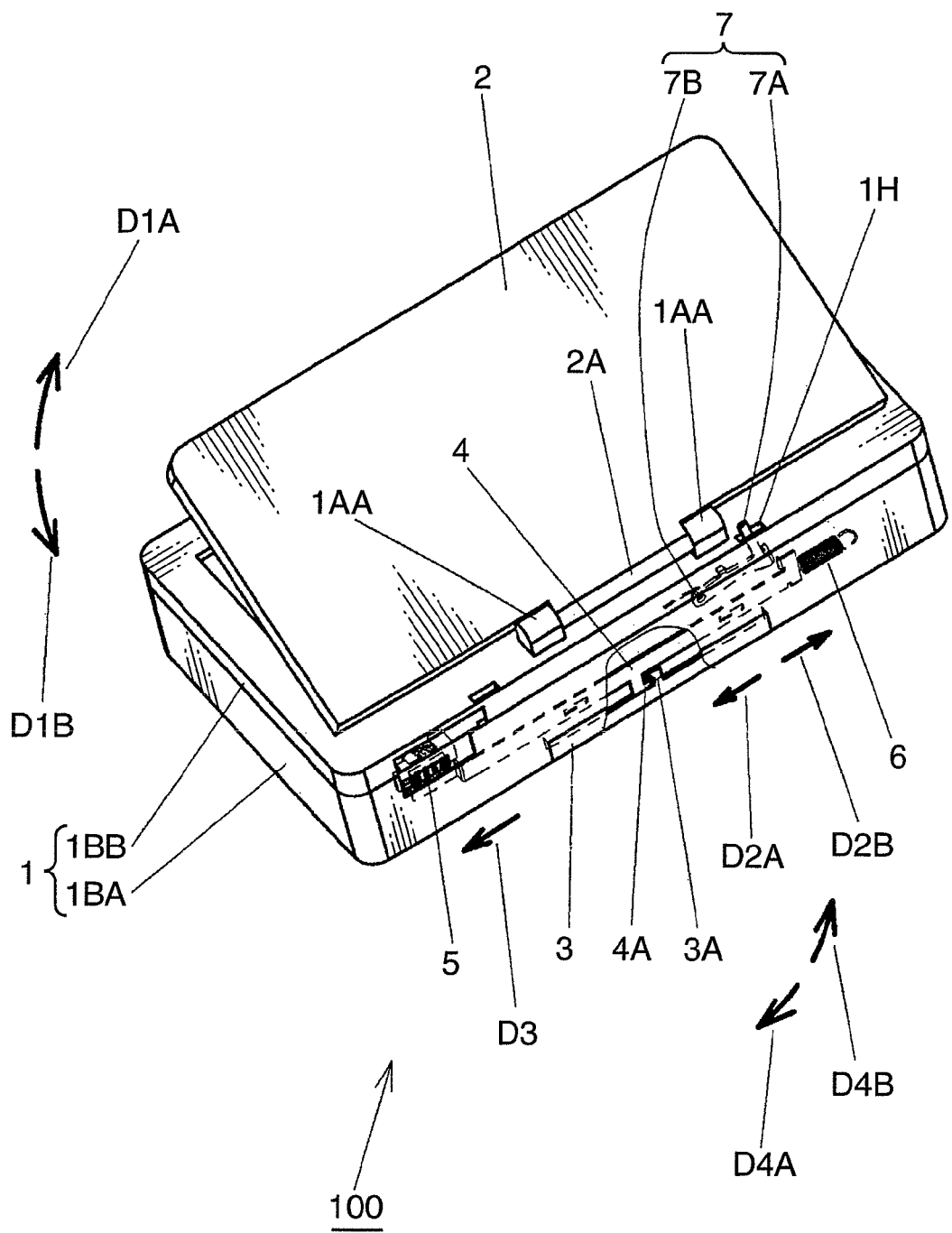
FIG. 1 is a perspective view showing a whole configuration of a disk apparatus according to a first embodiment of the present invention.
Figure 2:
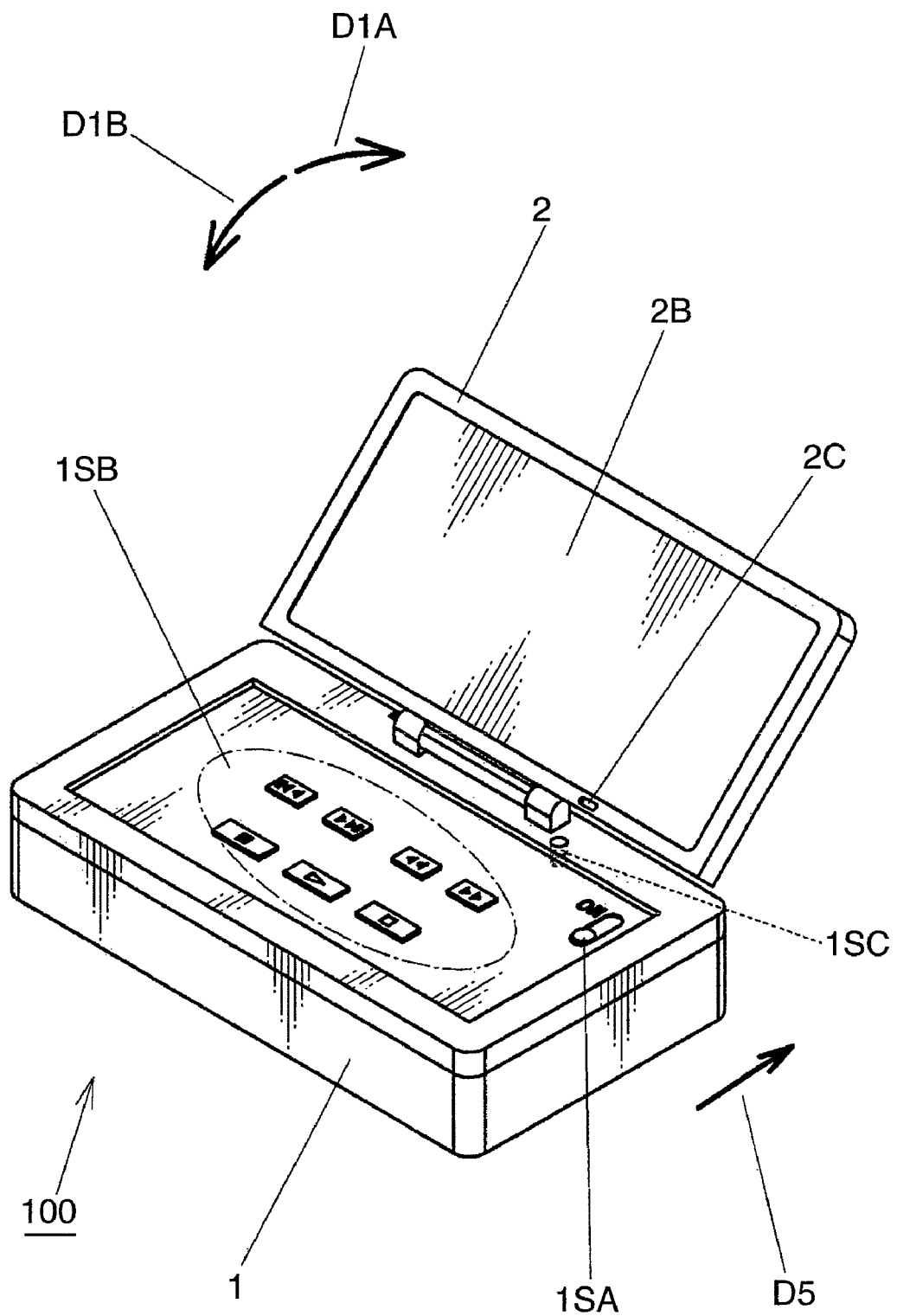
FIG. 2 is a perspective view showing a whole configuration of the disk apparatus of FIG. 1 with a lid body kept open.

FIGS. 1 and 2 show the whole configuration and external appearance of the disk apparatus according to the first embodiment, each seen from a different angle. In FIGS. 1 and 2, the disk apparatus 100 includes an apparatus body 1 as the body unit and a lid body 2 covering the apparatus body 1. The lid body 2 is provided at an edge thereof with a swing hinge portion 2A held on two swing supporting portions 1AA disposed in the apparatus body 1. This allows the lid body 2 to open and close in both directions of an arrow D1A and an arrow D1B. In FIGS. 1 and 2, the lid body 2 is at a different angle to the apparatus body 1.

In FIG. 2, a display 2B is attached to the lid body 2 as the display unit. It displays an image, including image contents, apparatus-operation information or the like. The display 2B is formed, for example, by a liquid-crystal panel or the like. A main-power switch 1SA is used for turning on or off the main power of the disk apparatus 100. A user can turn on the main power by moving it in the direction of an arrow D5. Further, an operation-switch group 1SB including each switch for a user operating the disk apparatus 100 is arranged in the middle of the top surface of the apparatus body 1. A power cut-off switch 1SC is used for cutting off all power supplies. It works when a cut-off protrusion 2C formed in the lid body 2 is pushed in by swinging and closing the lid body 2 in the direction of the arrow D1B. In order to prevent it from working easily with the lid body 2 kept open, the power cut-off switch 1SC is sunken from the surface.

Figure 3:
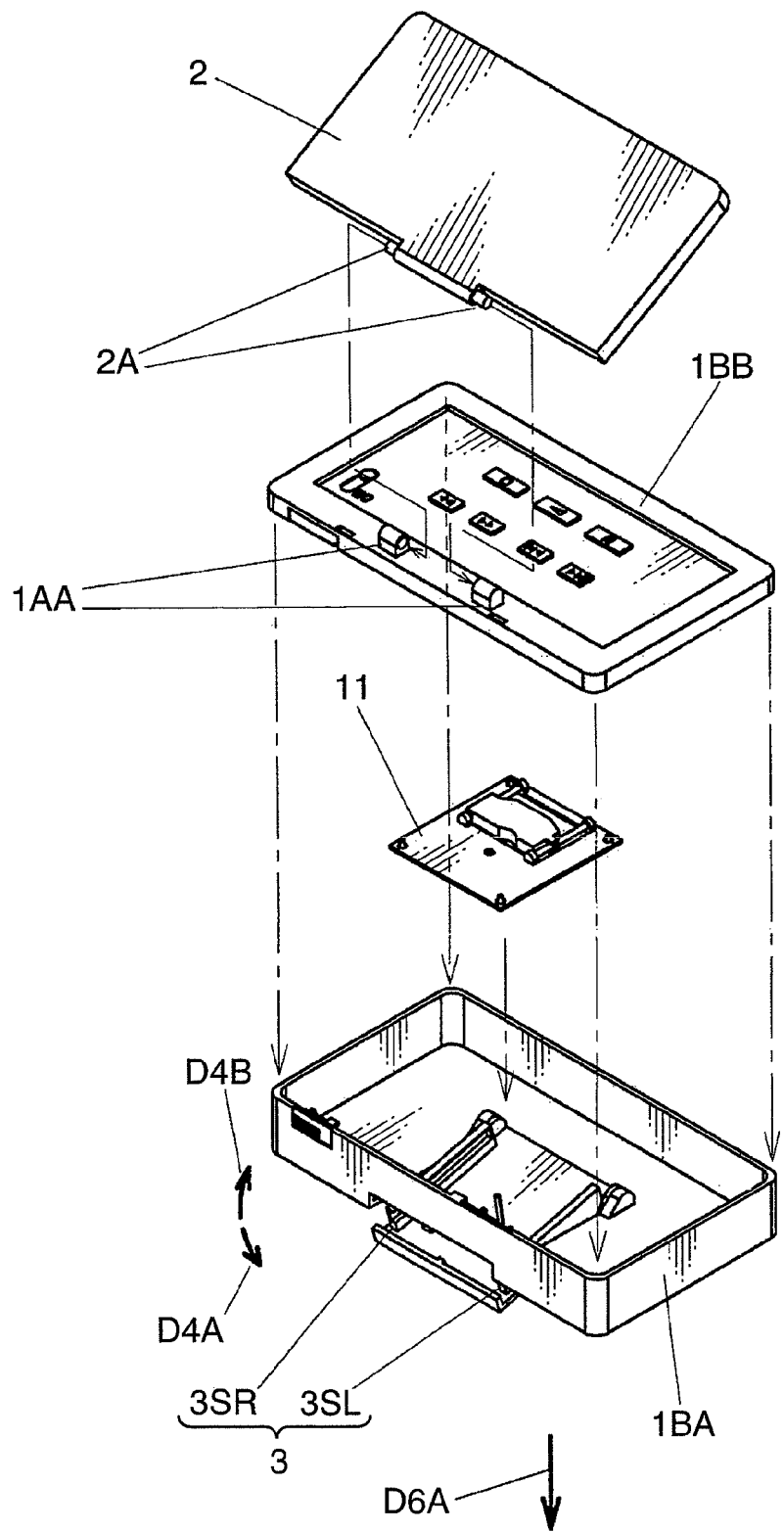
FIG. 3 is a first exploded perspective view showing how to assemble main component elements of the disk apparatus of FIG. 1.
Figure 4:
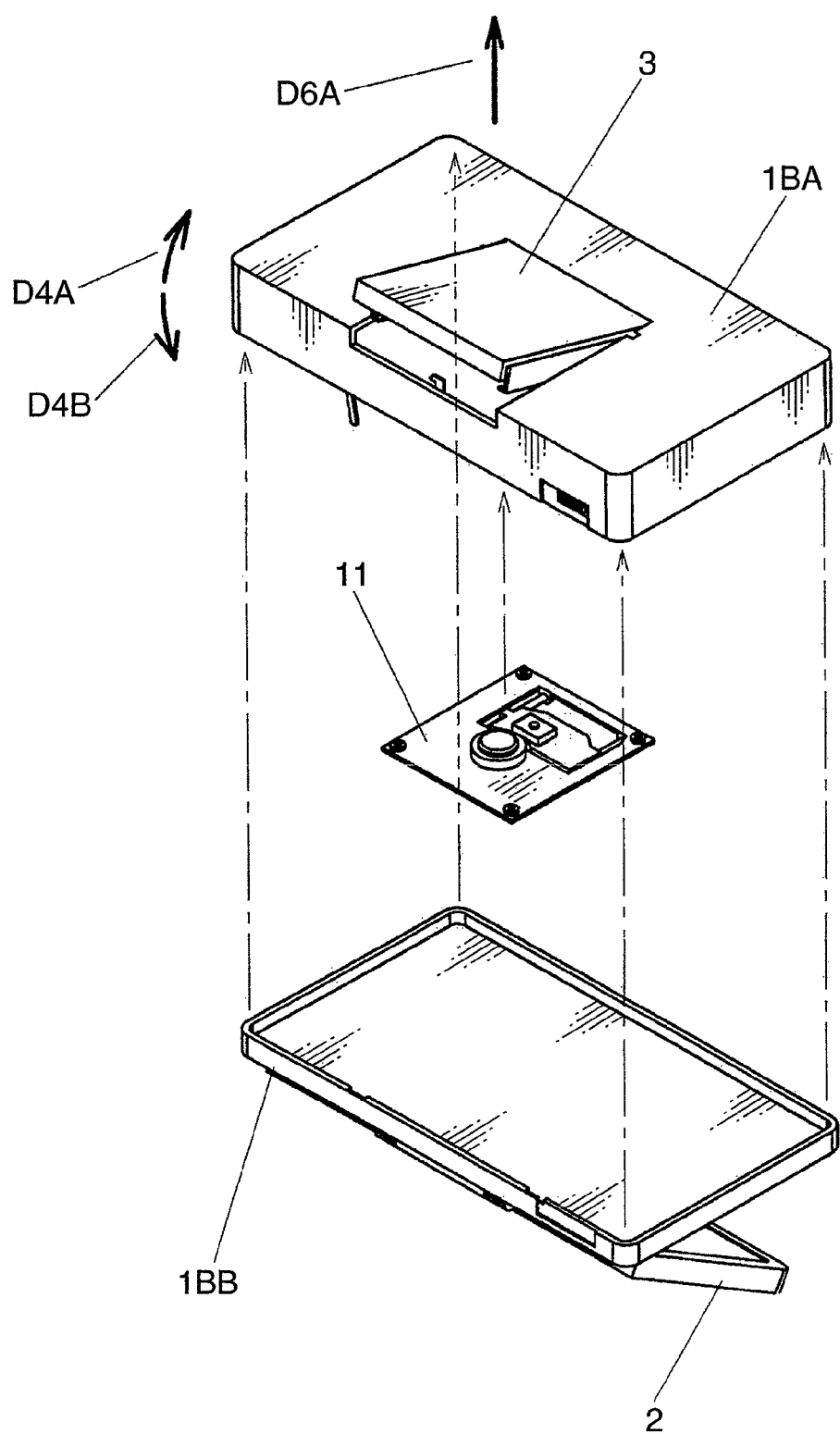
FIG. 4 is a second exploded perspective view showing how to assemble main component elements of the disk apparatus of FIG. 1.

FIG. 3 is an exploded perspective view showing how to assemble main component elements of the disk apparatus 100 of FIGS. 1 and 2. FIG. 4 is an exploded perspective seen from the bottom of the disk apparatus 100 shown in FIG. 3. In FIGS. 3 and 4, among the component elements of the apparatus body 1, reference numeral and character 1BA denotes a body lower case; 1BB, a body upper case; and 11, a disk drive portion for conducting recording and/or reproduction for a disk medium 31 (see FIG. 7) as the disk-shaped information recording medium having an information recording surface. In FIGS. 3 and 4, the user usually puts in and takes out the disk medium 31 with keeping the direction of an arrow D6A upward.

Figure 5:
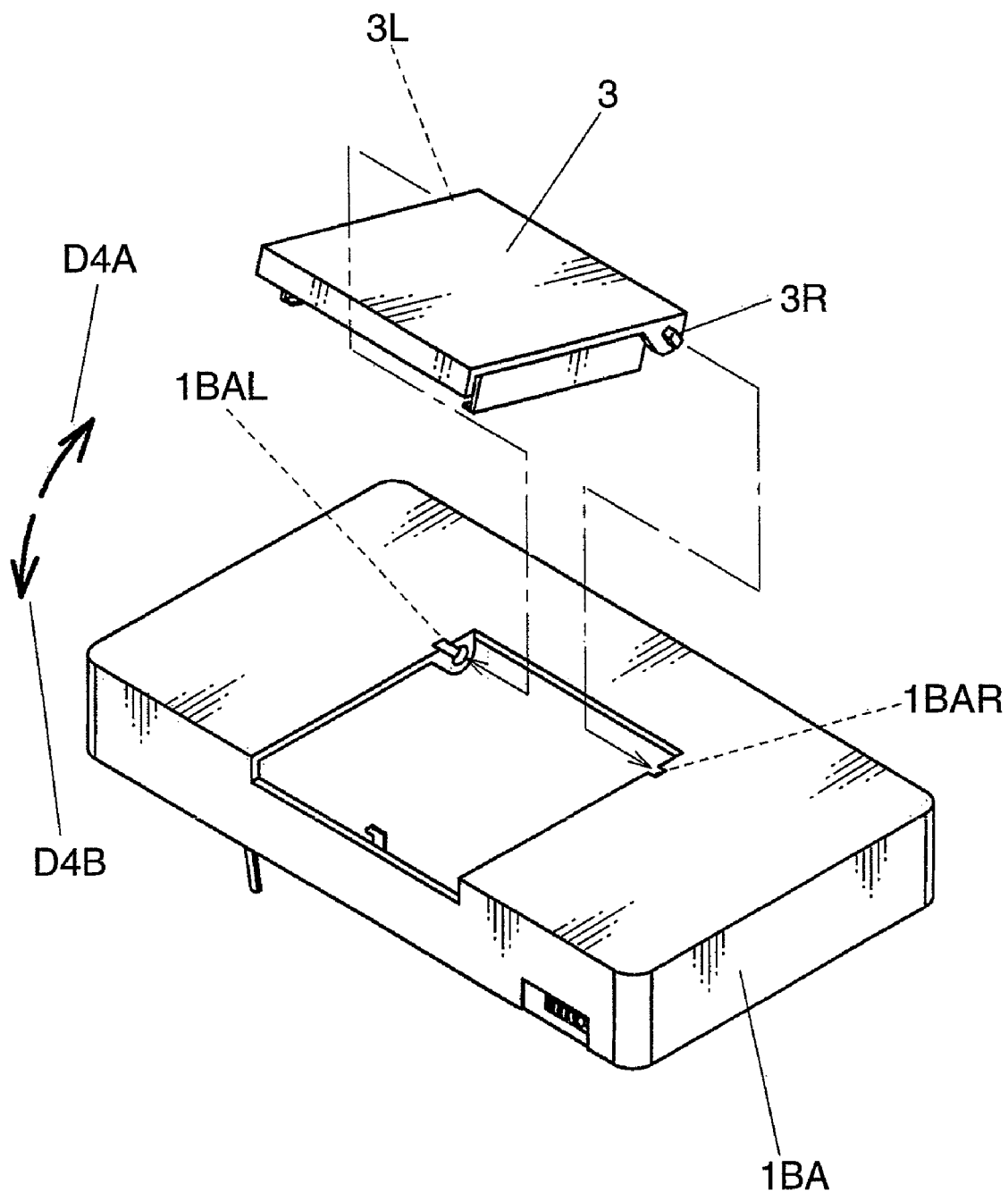
FIG. 5 is a third exploded perspective view showing how to assemble main component elements of the disk apparatus of FIG. 1.

As shown in FIGS. 1, 3 and 4, the apparatus body 1 is provided with a drive-portion cover 3 covering the disk drive portion 11. The user puts in and takes out the disk medium 31 by swinging the drive-portion cover 3 so as to open and close it. As shown in FIG. 5, two cover shafts 3L and 3R are united with the drive-portion cover 3 and fitted into two body bearings 1BAL and 1BAR, respectively. Thereby, the drive-portion cover 3 is held so as to swing in the directions of an arrow D4A and an arrow D4B. In this embodiment, the drive-portion cover 3 and the like configures the disk insertion-and-ejection mechanism which is movable in a bottom direction of the apparatus body 1 and inserts and ejects the disk medium 31 into and from the disk drive portion 11.

Figure 6:
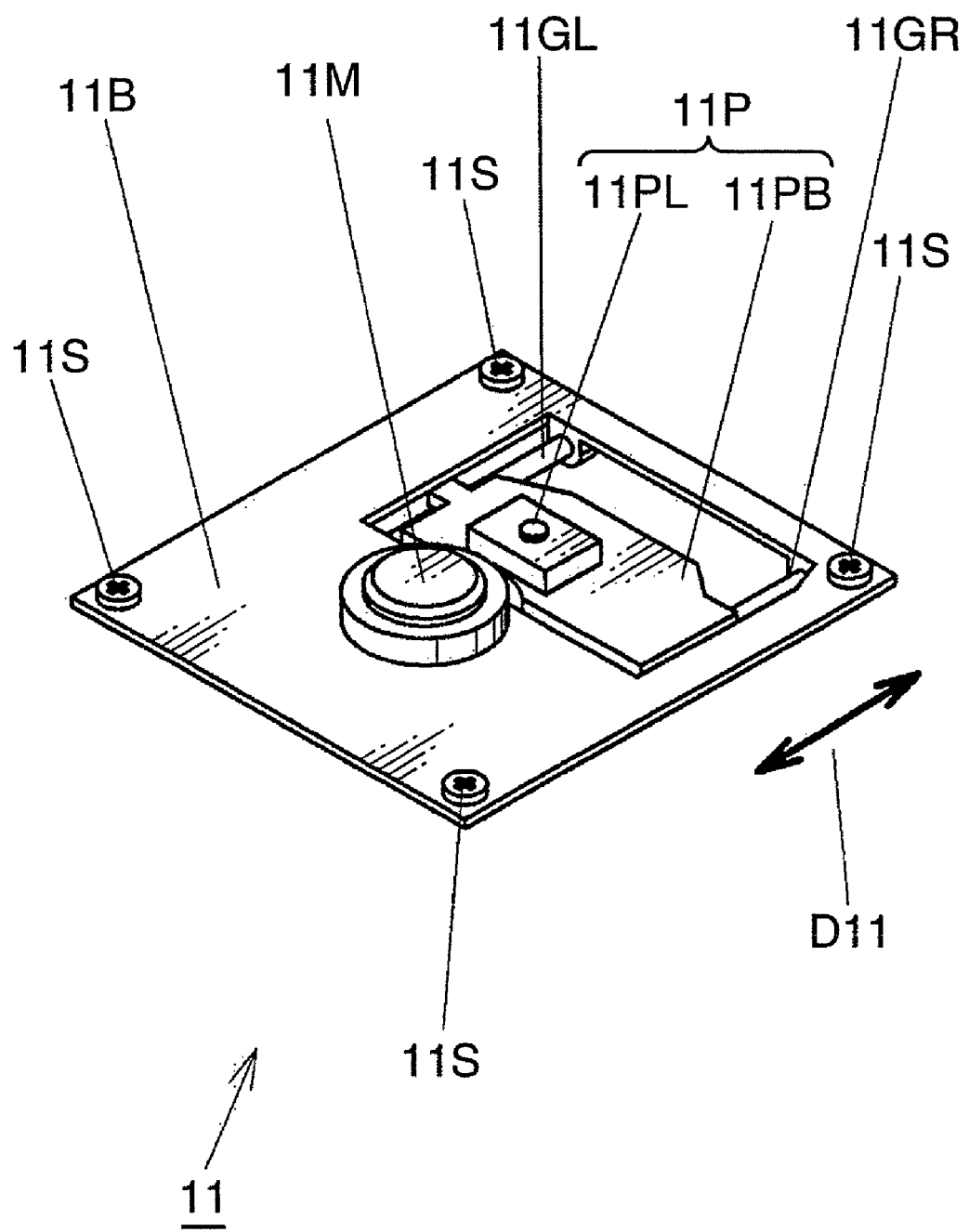
FIG. 6 is a perspective view of a disk drive portion of the disk apparatus of FIG. 1.

Next, a description will be given of a configuration of the disk drive portion 11. FIG. 6 shows a schematic configuration of the disk drive portion 11. In FIG. 6, the disk drive portion 11 includes a disk motor 11M, a pickup 11P, a drive-portion base 11B, guide shafts 11GL and 11GR, and vibration-isolation dampers 11S.

The disk motor 11M rotates the disk medium 31 placed and fixed there. The pickup 11P is formed by a pickup base portion 11PB and a lens portion 11PL mounted on there. It is guided and held by the two guide shafts 11GL and 11GR in such a way that it can move in the directions of an arrow D11 parallel to a specific radius direction of the disk medium 31 placed on the disk motor 11M. From the lens portion 11PL, a laser beam of a semiconductor laser or the like irradiates the disk medium 31 as the optical disk. The pickup lip conduct recording and/or reproduction on an information recording surface of the disk medium 31. The drive-portion base 11B holds the disk motor 11M and the guide shafts 11GL and 11GR. It is attached to the apparatus body 1 via each vibration-isolation damper 11S in four places in such a way that it can restrain a vibration from the outside or prevent the leakage of a vibration of the apparatus 100 caused by a disk rotation. Incidentally, a well-known drive mechanism can be employed for a drive mechanism sending the pickup 11P in the directions of the arrow D11. Thus, its figure and description are omitted.

Figure 7:
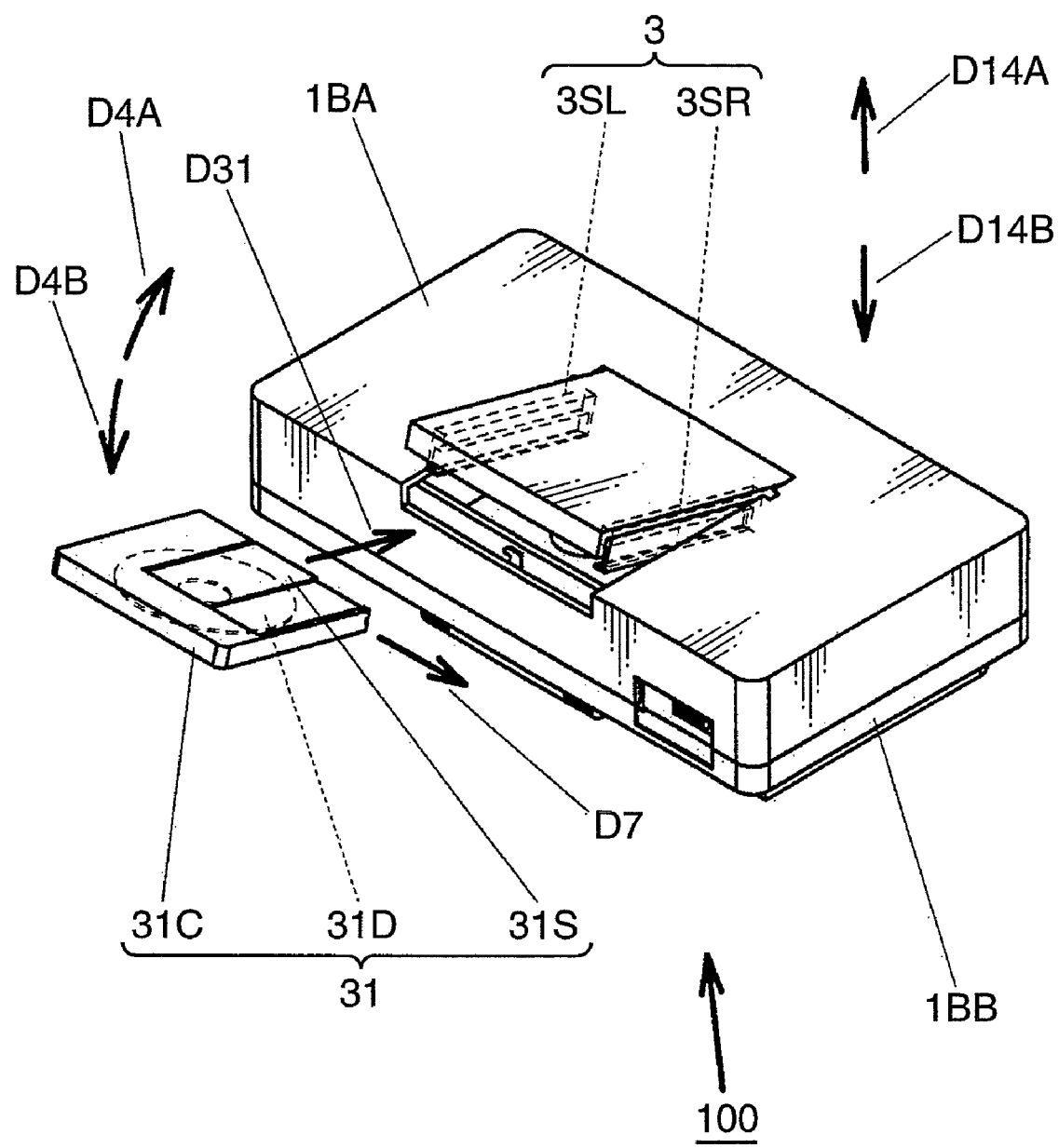
FIG. 7 is a perspective view showing how to insert a disk into the disk apparatus of FIG. 1.

Sequentially, a description will be given about a method for inserting the disk medium 31 into the disk apparatus 100 according to this embodiment. FIG. 7 is a perspective view showing how the above described disk insertion-and-ejection mechanism inserts the disk medium 31 into the disk apparatus 100. As shown in FIG. 7, in the disk apparatus 100 according to this embodiment, a disk cartridge 31C housing a disk 31D is used as the disk medium 31.

When using the disk medium 31, the user inserts the disk medium 31 in the direction of an arrow D31 into the disk apparatus 100 with the drive-portion cover 3 kept open in the direction of the arrow D4A. The drive-portion cover 3 includes cartridge guides 3SL and 3SR united thereto, and the disk medium 31 is guided and inserted along these cartridge guides 3SL and 3SR.

The disk cartridge 31C is provided with a cartridge shutter 31S opening and closing an opening for exposing an information recording surface of the disk 31D. Upon inserting it into the disk apparatus 100, a shutter opening mechanism (not shown) moves the cartridge shutter 31S in the direction of an arrow D7. This opens the opening to thereby expose the information recording surface of the disk 31D, so that a recording and a reproduction can be made.

Figure 8:
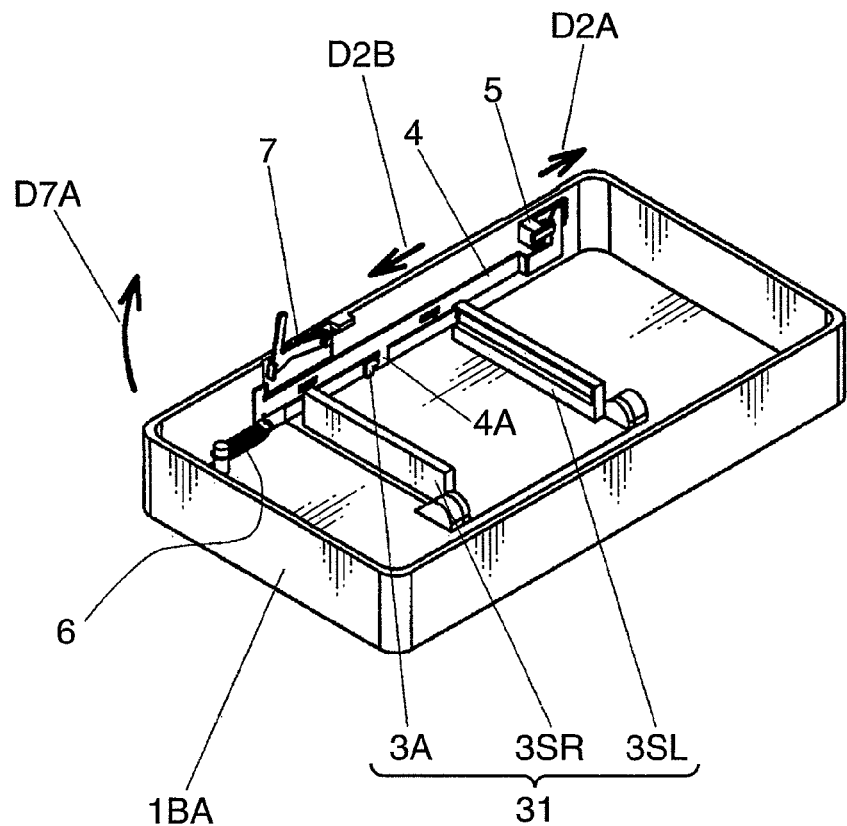
FIG. 8 is a perspective view showing a lock mechanism on a drive-portion cover of the disk apparatus of FIG. 1.
Figure 9:
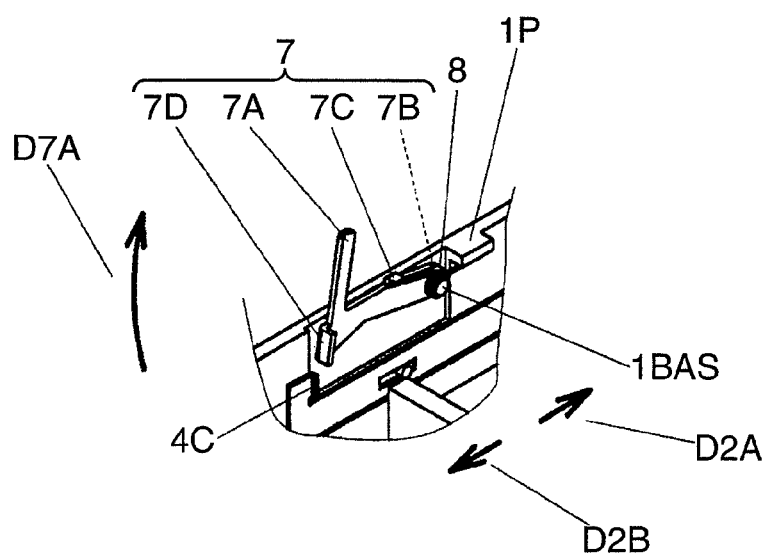
FIG. 9 is an enlarged perspective view of an ejection stopper shown in FIG. 8.

Next, a lock mechanism keeping the drive-portion cover 3 closed in the body lower case 1BA will be described with reference to FIG. 1 and FIGS. 8 to 11. FIGS. 8 and 9 show a main part inside of the apparatus body 1 on the side of the body lower case 1BA. FIG. 8 shows the whole and FIG. 9 shows the details thereof.

In FIG. 1 and FIGS. 8 and 9, reference numeral 4 designates a lock slider for keeping the drive-portion cover 3 closed in the body lower case 1BA. The lock slider 4 is held on the body lower case 1BA in such a way that it can slide in the directions of an arrow D2A and an arrow D2B. It is always given a force in the direction of the arrow D2B by a slider spring 6. The lock slider 4 is provided with a slide knob 5 connected thereto. This slide knob 5 is used for sliding it in the direction of the arrow D2A from outside of the body lower case 1BA. Further, the lock slider 4 is united at a middle lower part thereof with a lock hook 4A hooking a cover hook 3A united with the drive-portion cover 3. The lock hook 4A and the cover hook 3A prevent the drive-portion cover 3 from swinging in the direction of the arrow D4A (see FIG. 1 or another).

Figure 10:
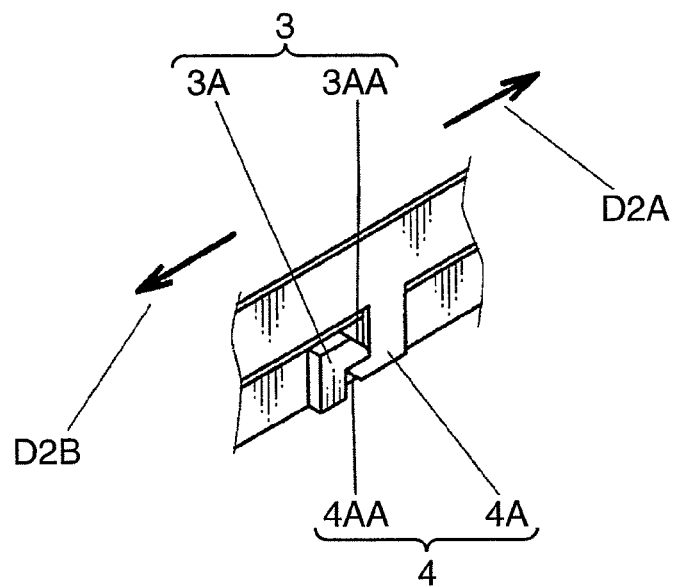
FIG. 10 is an enlarged perspective view showing a locking state of the lock mechanism of FIG. 8.
Figure 11:
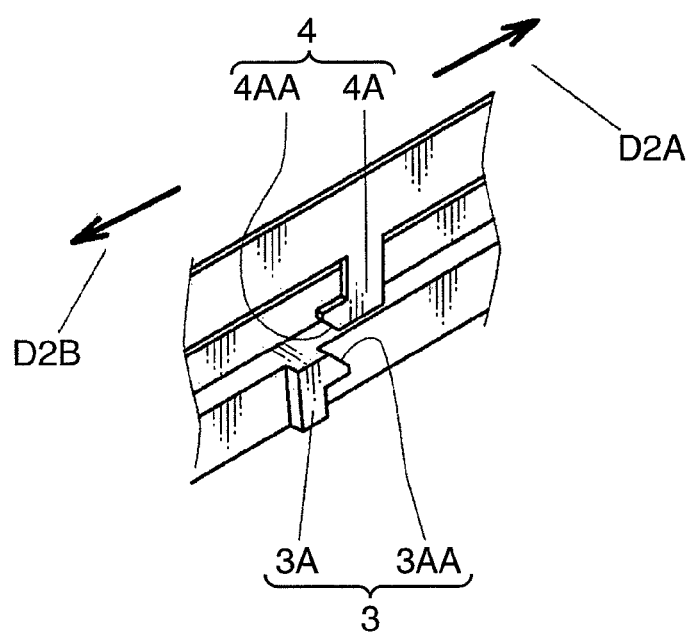
FIG. 11 is an enlarged perspective view showing an unlocking state of the lock mechanism of FIG. 8.

FIGS. 10 and 11 show how to hook the lock hook 4A on the cover hook 3A of FIG. 8, after and before the hooking, respectively. As shown in FIGS. 10 and 11, the lock hook 4A and the cover hook 3A are formed with a lock-hook taper surface 4AA and a cover-hook taper surface 3AA, respectively.

According to this configuration, for example, if the drive-portion cover 3 is swung in the direction of the arrow D4B from the state shown in FIG. 7, then from the separate state from the cover-hook taper surface 3AA shown in FIG. 11, the lock-hook taper surface 4AA comes into contact with it. If the drive-portion cover 3 is further swung in the direction of the arrow D4B, the cover-hook taper surface 3AA presses the lock-hook taper surface 4AA. This pressing force turns into a force in the direction of the arrow D2A, which moves the lock slider 4 in the direction of the arrow D2A against the force of the slider spring 6. Then, the lock-hook taper surface 4AA finishes passing through the cover-hook taper surface 3AA. Again, the lock slider 4 moves in the direction of the arrow D2B by the force of the slider spring 6. Then, the lock hook 4A completely hooks the cover hook 3A, thus reaching the state of FIG. 10, in other words, the locking state of FIG. 8.

Figure 12:
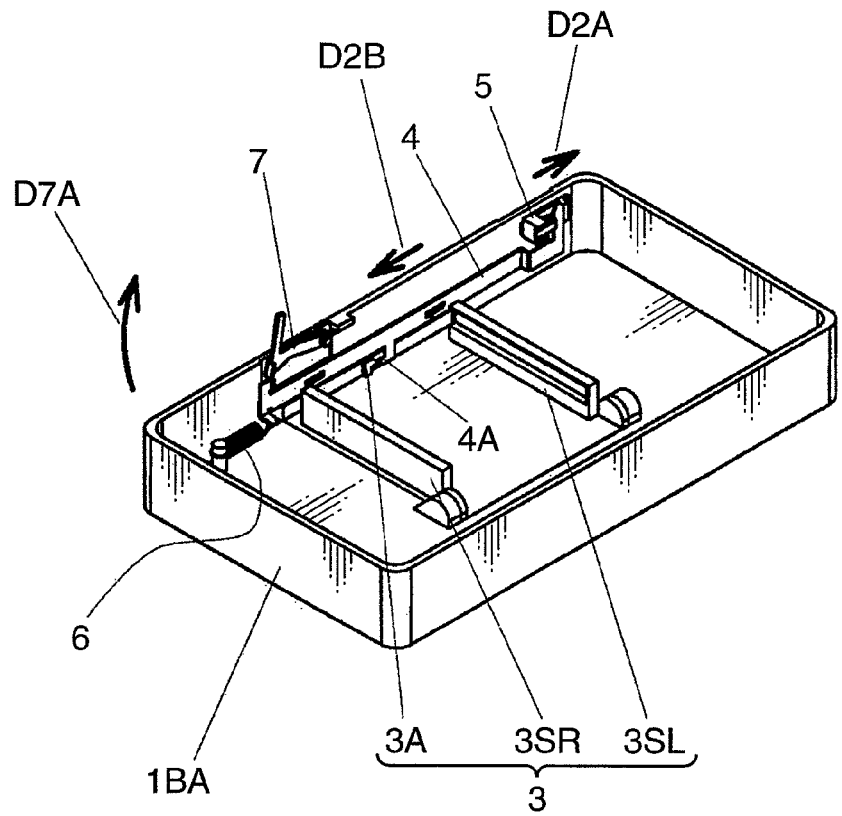
FIG. 12 is a perspective view showing the unlocking state of the lock mechanism of FIG. 8.

Oppositely, if the user moves the slide knob 5 from outside in the direction of an arrow D3 shown in FIG. 1, as shown in FIG. 12, the lock slider 4 slides in the direction of the arrow D2A against the force of the slider spring 6. Thereby, the lock hook 4A unhooks the cover hook 3A, allowing the drive-portion cover 3 to open at this time in the direction of the arrow D4A of FIG. 7. Incidentally, the drive-portion cover 3 may also be opened by utilizing the weight of the drive-portion cover 3 itself, or using a forcing member such as a coil spring as assistance.

Next, a description will be given about how to prevent the lock slider 4 from sliding in the direction of the arrow D2A in such a way that the drive-portion cover 3 does not open in the direction of the arrow D4A while the disk apparatus 100 according to this embodiment is in operation. FIGS. 1, 8, 9 and 12 to 15, reference numeral 7 denotes an ejection stopper preventing the lock slider 4 from sliding in the direction of the arrow D2A. The ejection stopper 7 is held so as to pivot by inserting an ejection-stopper shaft 1BAS provided in the body lower case 1BA into an ejection-stopper pivot hole 7B. An ejection-stopper spring 8 is attached to the ejection-stopper shaft 1BAS as a support shaft thereof. One end of the ejection-stopper spring 8 is hitched to a fixation-side spring hitch 1P provided in the body lower case 1BA. The other end thereof is hitched to a pivot-side spring hitch 7C provided in the ejection stopper 7. The ejection-stopper spring 8 is a torsion coil spring thus forcing the ejection stopper 7 to pivot in the direction of an arrow D7A shown in FIGS. 8, 9, 12 and 13.

According to the above described configuration, when the body upper case 1BB is incorporated into the body lower case 1BA, as shown in FIG. 1, an ejection-stopper press portion 7A provided in the ejection stopper 7 penetrates a through hole 1H provided in the body upper case 1BB. Hence, it juts out from the surface of the body upper case 1BB.

Figure 13:
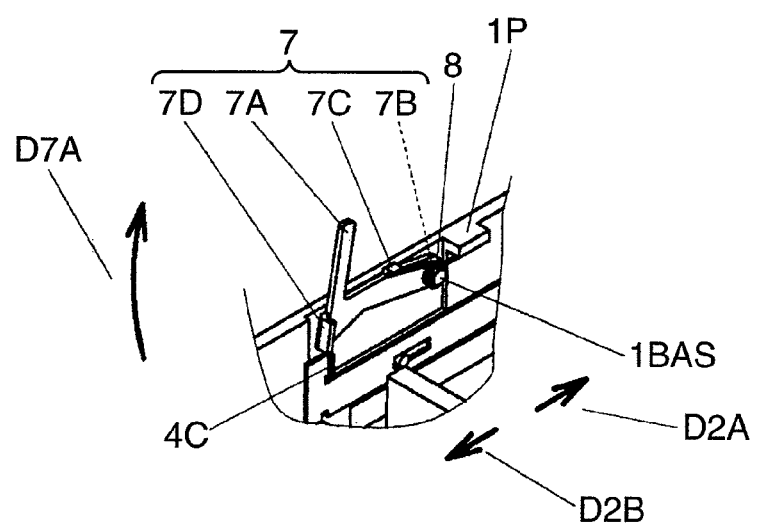
FIG. 13 is an enlarged perspective view of the ejection stopper shown in FIG. 12.

As shown in FIG. 1, the lid body 2 does not press the ejection-stopper press portion 7A when the lid body 2 is not largely open in the direction of the arrow D1A. In this state, as shown in FIGS. 8 and 9, the lock slider 4 is movable in the direction of the arrow D2A. In other words, in this state where the lock mechanism can be unlocked, as shown in FIGS. 12 and 13, the user can move the lock slider 4 in the direction of the arrow D2A and open the drive-portion cover 3. This makes it possible to insert and eject the disk cartridge 31C freely.

Figure 14:
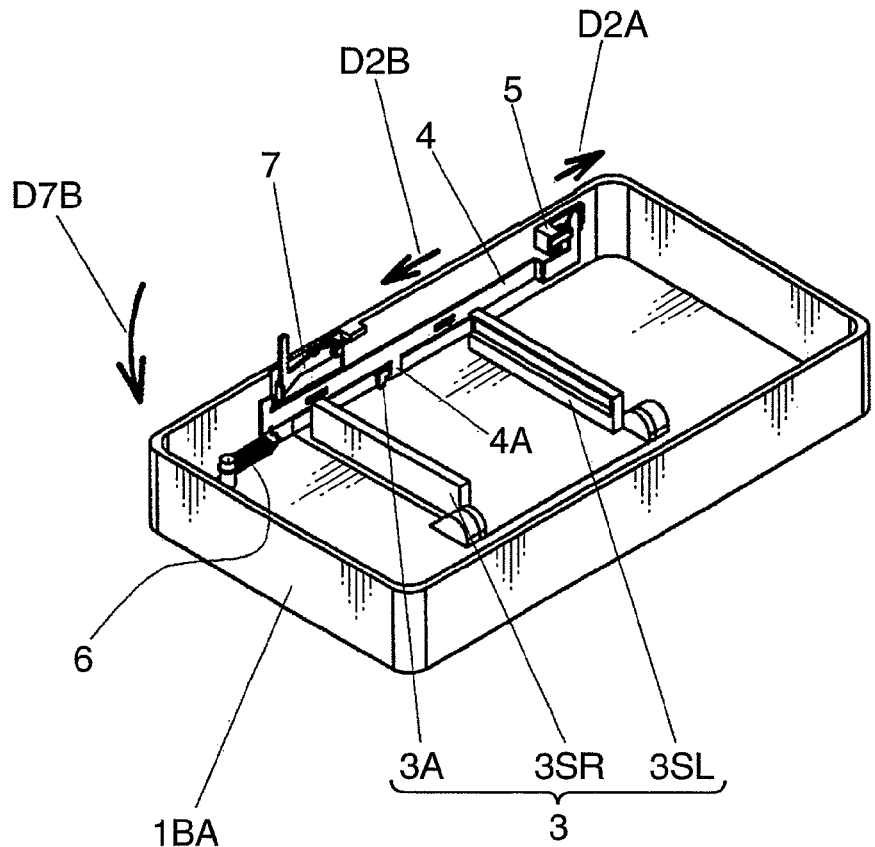
FIG. 14 is a perspective view showing the locking state of the lock mechanism of FIG. 8.
Figure 15:
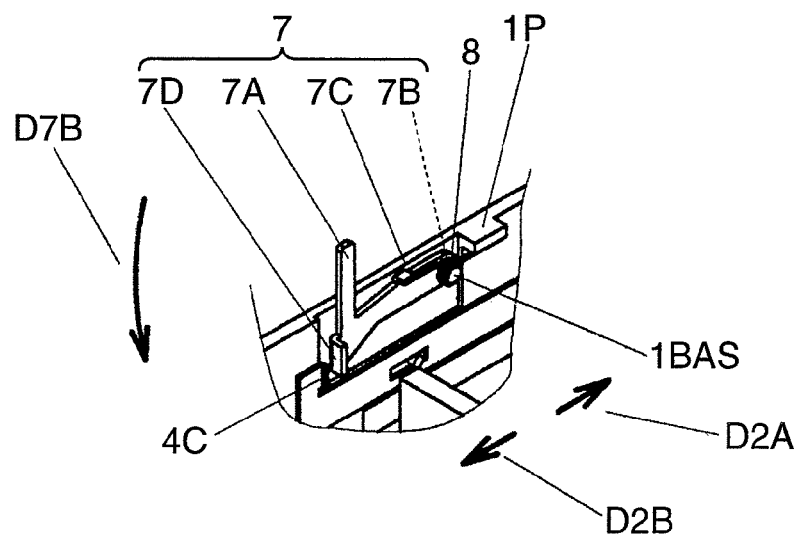
FIG. 15 is an enlarged perspective view of a part of the ejection stopper shown in FIG. 14.

In the state shown in FIG. 2, the user can watch the display 2B and manipulate the main-power switch 1SA, the operation-switch group 1SB or the like. If the lid body 2 opens in the direction of the arrow D1A and comes into this state, a lower edge part of the lid body 2 presses in the ejection-stopper press portion 7A. As shown in FIGS. 14 and 15, the ejection stopper 7 pivots in the direction of an arrow D7B. At this time, a lock hook-stopping portion 4C provided in the lock slider 4 comes into contact with a stopper hook-stopping portion 7D provided in the ejection stopper 7. Thereby, the stopper hook-stopping portion 7D hinders the lock hook-stopping portion 4C from moving so that the lock slider 4 cannot move in the direction of the arrow D2A. In short, the disk medium 31 cannot be taken out if the disk drive portion 11 starts to operate with the disk medium 31 kept inserted.

Once a reproduction or a recording starts for the disk 31D with the lid body 2 kept open as described above after the disk medium 31 (see FIG. 7) is inserted, the disk 31D rotates and a laser beam irradiates the disk medium 31 from the lens portion 11PL in the disk drive portion 11. If the user takes out the disk medium 31 during this operation, the disk 31D may fly out at the user, or a laser beam from a semiconductor laser can enter the eyes of the user. However, in the disk apparatus 100 according to this embodiment, as described above, the user cannot take out the disk medium 31 with the lid body 2 kept opened with respect to the apparatus body 1, in other words, with the disk drive portion 11 in operation. This helps prevent the above described problem.

Furthermore, as shown in FIG. 2, the user cannot operate the main-power switch 1SA and the operation-switch group 1SB until the lid body 2 is opened with respect to the apparatus body 1 so that the disk medium 31 cannot be ejected. This is helpful in preventing the disk 31D from rotating accidentally and a semiconductor laser from emitting a beam outside before the disk medium 31 is securely inserted.

Moreover, after a reproduction or a recording is once made for the disk 31D in the state of FIG. 2, the user may swing and close the lid body 2 in the direction of the arrow D1B by mistake with the main-power switch 1SA remaining "on". However, even if the disk medium 31 can be taken out, this swing of the lid body 2 allows the cut-off protrusion 2C to press and operate the power cut-off switch 1SC. This helps prevent the drive-portion cover 3 from opening while the disk 31D is being rotated or a semiconductor laser is emitting a beam.

As described so far, in the disk apparatus 100 according to this embodiment, when the lid body 2 is opened with respect to the apparatus body 1, the lock slider 4 keeps the drive-portion cover 3 in a state where the disk medium 31 cannot be inserted and ejected. Hence, the disk medium 31 is not supposed to be taken out while the disk drive portion 11 is making a recording or a reproduction for the disk medium 31. This makes it possible to prevent the disk 31D from flying out or being exposed while rotating. As a result, the user can be protected from the rotating disk 31D, a beam from a semiconductor laser or the like.

In addition, as is the case with the disk apparatus 100 according to this embodiment, if the display 2B is attached to the lid body 2 over the apparatus body 1, the drive-portion cover 3 needs to be placed in a bottom part of the apparatus body 1 and opened and closed on the opposite side to the display 2B. In this case, in an ordinary state where the display 2B is above the apparatus body 1, if the drive-portion cover 3 opens by accident, the disk medium 31 may fly out instantly because of its.

However, in this embodiment, a locking operation of the lock slider 4 interlocks with a relative movement of the lid body 2 with respect to the apparatus body 1. Thus, the locking state can be automatically maintained as the lid body 2 opens. This makes it possible to evade the above problem using such a simple configuration.

But another situation is thinkable. When the ejection-stopper press portion 7A is pushed in, as shown in FIGS. 14 and 15, the ejection stopper 7 pivots in the direction of the arrow D7B. This may disable the lock slider 4 from sliding in the direction of the arrow D2A. At this time, if the user slides the slide knob 5 by force, that can damage the slide knob 5, the lock slider 4, the ejection stopper 7, the ejection-stopper shaft 1BAS or the like.

Figure 16:
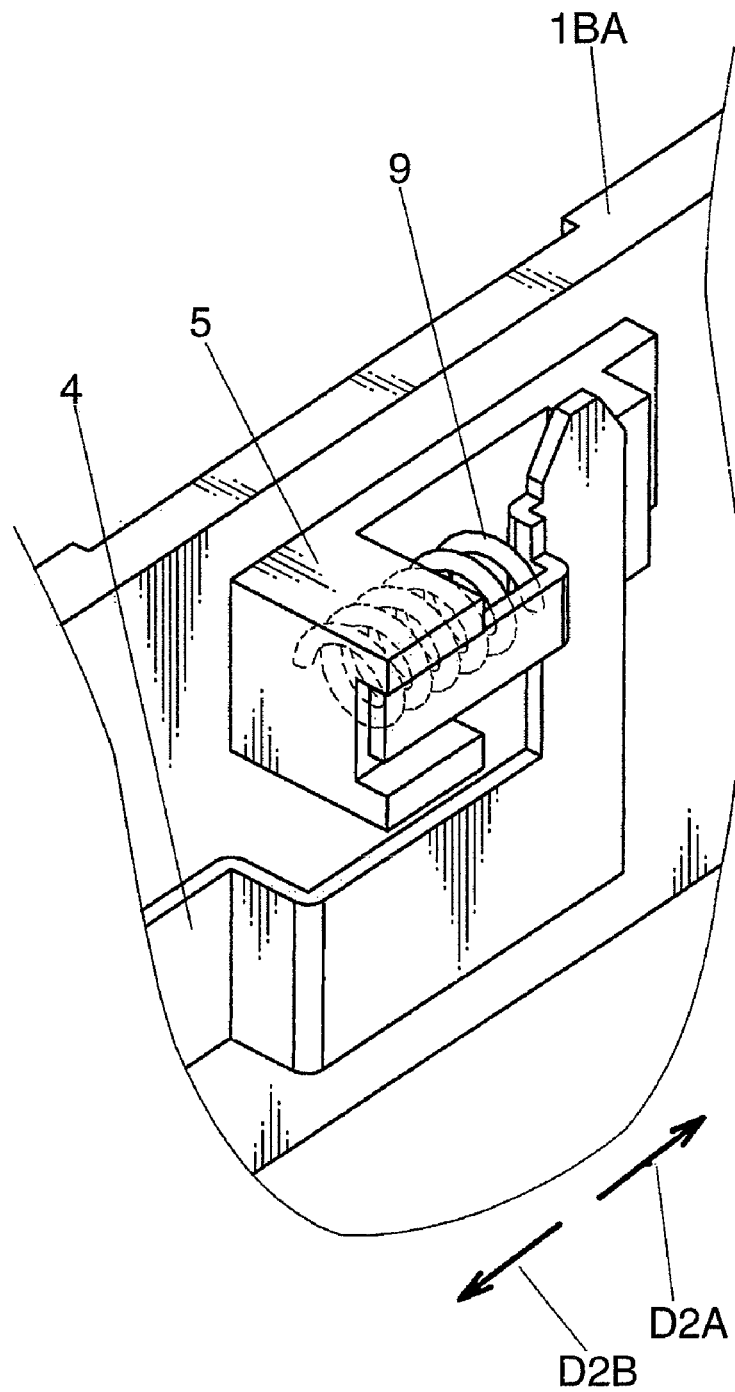
FIG. 16 is a perspective view showing an overload prevention mechanism for the lock mechanism on the drive-portion cover of the disk apparatus of FIG. 1.

A configuration for preventing this will be described with reference to FIG. 16. FIG. 16 shows the details of the slide knob 5 and its vicinity in FIGS. 1, 8, 9 and 12 to 15. In FIG. 16, reference numeral 9 designates an overload prevention spring as a compression spring. The overload prevention spring 9 forces the slide knob 5 in the direction of the arrow D2B against the lock slider 4. According to this configuration, in the state where the ejection stopper 7 hinders the lock slider 4 from sliding in the direction of the arrow D2A, even if the user slides the slide knob 5 further in the direction of the arrow D2A, the force by which the user is handling the slide knob 5 is absorbed. This is because the lock slider 4 is hindered from sliding in the direction of the arrow D2A to thereby compress the overload prevention spring 9. This configuration helps block a transfer of the force by which the user is handling the slide knob 5 to the lock slider 4, the ejection-stopper shaft 1BAS or the like.

At this time, a spring force of the overload prevention spring 9 is set to F9; a spring force of the slider spring 6, F6; a maximum force for the user handling the slide knob 5, FO; and a minimum breaking strength of any member of the slide knob 5, the lock slider 4 and the ejection-stopper shaft 1BAS when the user slides the slide knob 5 in the direction of the arrow D2A with the slide knob 5 and the lock slider 4 directly connected without the overload prevention spring 9, FM. When the lock slider 4 slides in the direction of the arrow D2A without being hindered by the ejection stopper 7, it needs to be slid against the spring force of the slider spring 6. In other words, (expression 1) needs to be satisfied.

$$F6<F9 \quad \text{(expression 1)}$$

In order to obtain the effect, as a matter of course, the handling force of the user has to exceed the force of the overload prevention spring 9. This needs (expression 2) satisfied.

$$F9<FO \quad \text{(expression 2)}$$

Further, forcible handling of the slide knob 5 in the direction of the arrow D2A by the user must be prevented from destroying any member of the slide knob 5, the lock slider 4 and the ejection-stopper shaft 1BAS. This requires the satisfaction of (expression 3).

$$F9<FM \quad \text{(expression 3)}$$

According to the above configuration, in this embodiment, even if the user moves the slide knob 5 by force in the unlocking direction with the drive-portion cover 3 kept locked on the apparatus body 1, this act is not supposed to overload the whole system of the lock mechanism. Hence, the slide knob 5, the lock slider 4, the ejection-stopper shaft 1BAS and the ejection stopper 7 can be prevented from being damaged.

Next, in this embodiment, how to prevent the lock slider 4 from sliding in the direction of the arrow D2A when the lid body 2 acts on the ejection-stopper press portion 7A will be described step by step with reference to FIGS. 17 to 26.

FIGS. 17 to 26 show an example of a configuration for realizing the above function and are each a side view of the disk apparatus 100 according to this embodiment. FIGS. 18, 20, 22, 24 and 26 are each an enlarged view showing the details of a part S2 shown in FIGS. 17, 19, 21, 23 and 25.

In FIGS. 17 to 26, reference numeral and character 2P denotes a stopper pressing portion which is united to the lid body 2 near the swing supporting portion 1AA and that can press the ejection-stopper press portion 7A in the direction of an arrow D7W when the lid body 2 swings in the direction of the arrow D1A. The stopper pressing portion 2P includes a first press surface 2K1 and a second press surface 2K2. The first press surface 2K1 is an inclined surface united to an edge part of the lid body 2 in such a way that the distance from the swing center of the lid body 2 to the radius directions becomes gradually longer as the lid body 2 opens. The second press surface 2K2 is a curved surface united to an edge part of the lid body 2 in such a way that the distance from the swing center of the lid body 2 to the radius directions becomes constant as the lid body 2 opens further. Thereby, the first press surface 2K1 interlocks with an opening movement of the lid body 2, comes into contact with the top surface of the ejection-stopper press portion 7A and presses the ejection-stopper press portion 7A into the apparatus body 1. When the lid body 2 opens further, the second press surface 2K2 comes into contact with the top surface of the ejection-stopper press portion 7A and presses the ejection-stopper press portion 7A into the apparatus body 1. Then, this pressing state is maintained.

Figure 17:
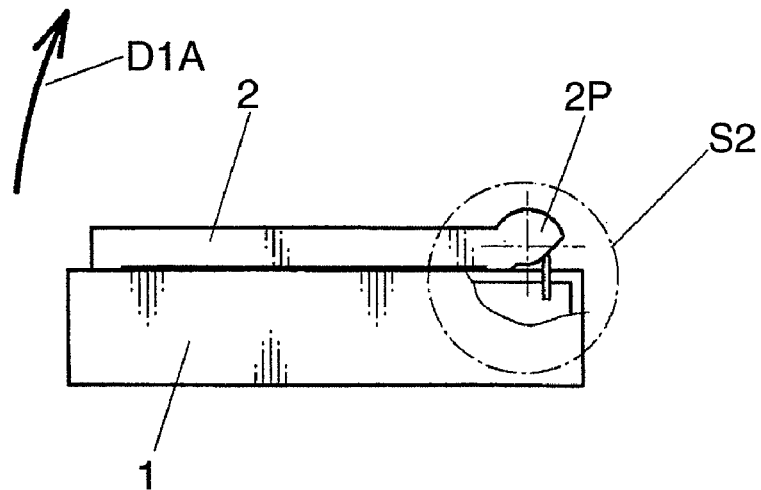
FIG. 17 is a side view showing the lid body closed with respect to an apparatus body in the disk apparatus of FIG. 1.
Figure 18:
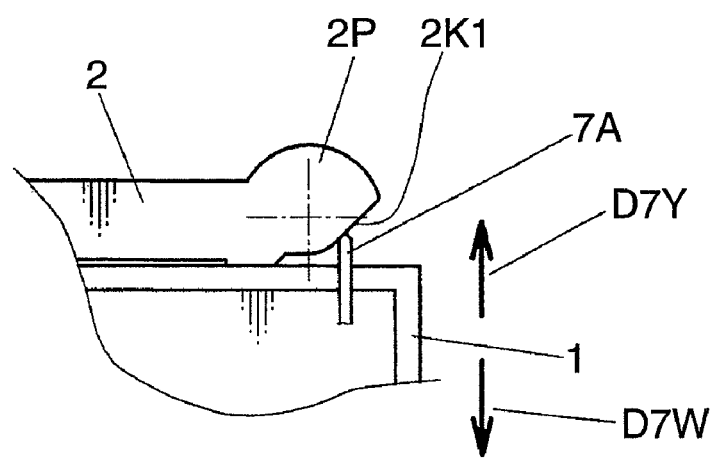
FIG. 18 is a partly enlarged view of the disk apparatus shown in FIG. 17.

FIGS. 17 and 18 show that the lid body 2 is kept closed at the apparatus body 1 (the lid body 2 lies at an angle of zero degrees to the apparatus body 1). In this state, although the first press surface 2K1 of the stopper pressing portion 2P is in contact with the top surface of the ejection-stopper press portion 7A, the first press surface 2K1 is designed not to press the ejection-stopper press portion 7A. Hence, the ejection-stopper press portion 7A remains unmoved in the direction of the arrow D7W. In this state, the ejection-stopper spring 8 (see FIG. 15) gives a force to the ejection-stopper press portion 7A in the direction of an arrow D7Y. In the same way as the state of FIG. 8, the lock slider 4 can slide in the directions of the arrows D2A and D2B thus making it possible to open the drive-portion cover 3.

Figure 19:
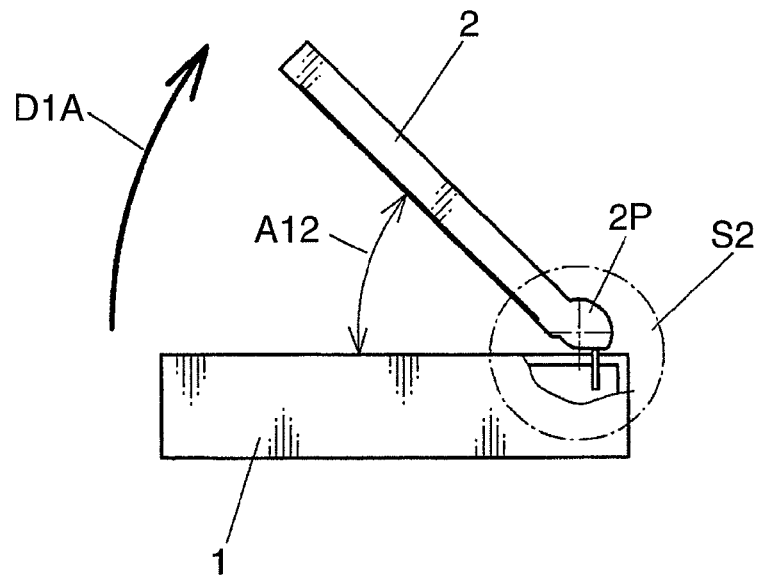
FIG. 19 is a side view showing the lid body at an angle of 45 degrees to the unit body in the disk apparatus of FIG. 1.
Figure 20:
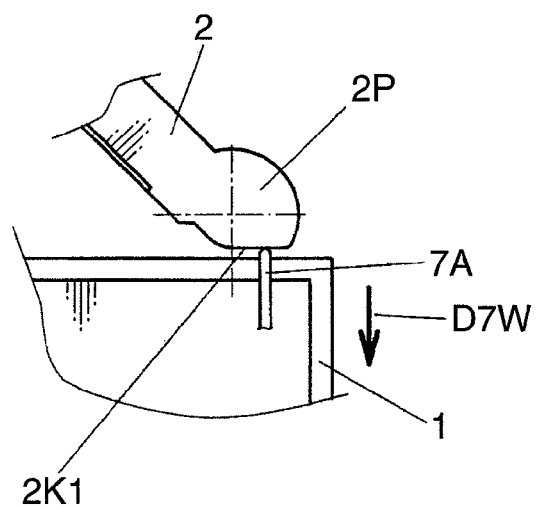
FIG. 20 is a partly enlarged view of the disk apparatus shown in FIG. 19.

FIGS. 19 and 20 show that the lid body 2 begins to open in the direction of the arrow D1A with respect to the apparatus body 1 and rises at an angle A12 of 45 degrees to the apparatus body 1. Substantially below this angle, it is almost hard for the user to operate the main-power switch 1SA and the operation-switch group 1SB as well as view the display 2B in the disk apparatus 100 according to this embodiment. On the other hand, in this state, the first press surface 2K1 of the stopper pressing portion 2P presses the ejection-stopper press portion 7A in the direction of the arrow D7W. This hinders the lock slider 4 from sliding in the direction of the arrow D2A thus making it impossible to open the drive-portion cover 3.

Figure 21:
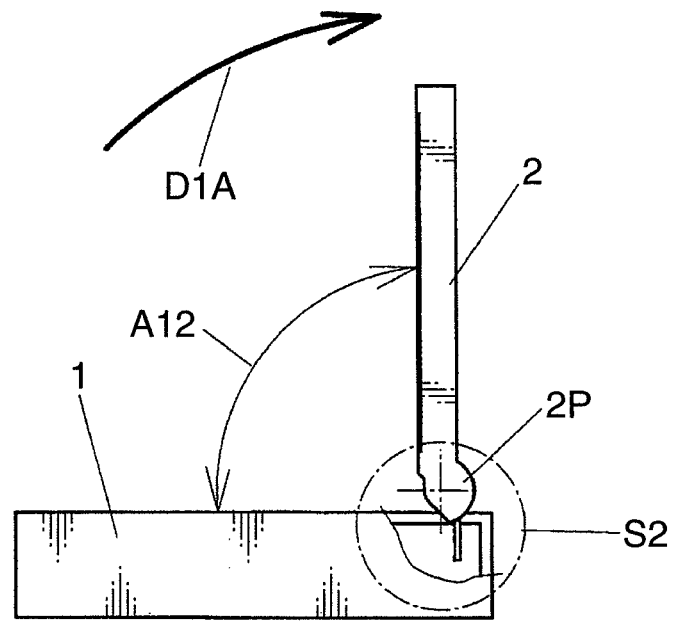
FIG. 21 is a side view showing the lid body at an angle of 90 degrees to the unit body in the disk apparatus of FIG. 1.
Figure 22:
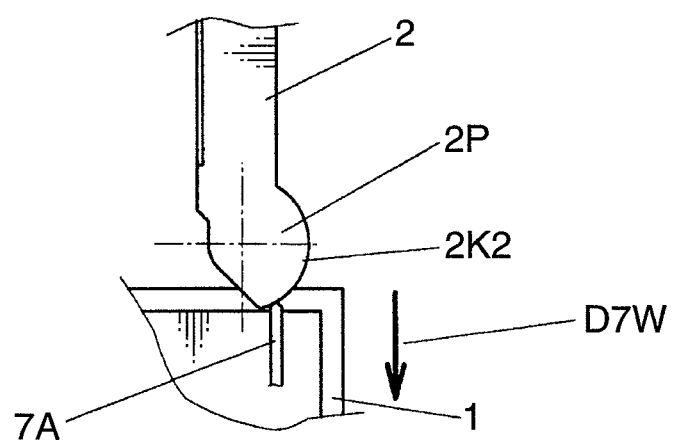
FIG. 22 is a partly enlarged view of the disk apparatus shown in FIG. 21.

FIGS. 21 and 22 show that the lid body 2 opens further in the direction of the arrow D1A from the apparatus body 1 and stands at the angle A12 of 90 degrees to the apparatus body 1. In this state, the user can operate the main-power switch 1SA and the operation-switch group 1SB as well as view the display 2B without any particular trouble in the disk apparatus 100. The second press surface 2K2 of the stopper pressing portion 2P keeps the ejection-stopper press portion 7A pressed in the direction of the arrow D7W. This still hinders the lock slider 4 from sliding in the direction of the arrow D2A.

Figure 23:
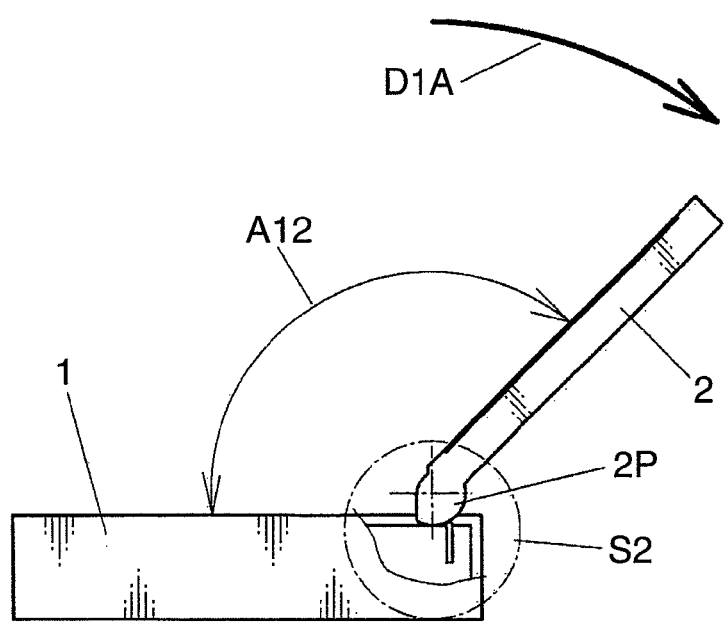
FIG. 23 is a side view showing the lid body at an angle of 135 degrees to the unit body in the disk apparatus of FIG. 1.
Figure 24:
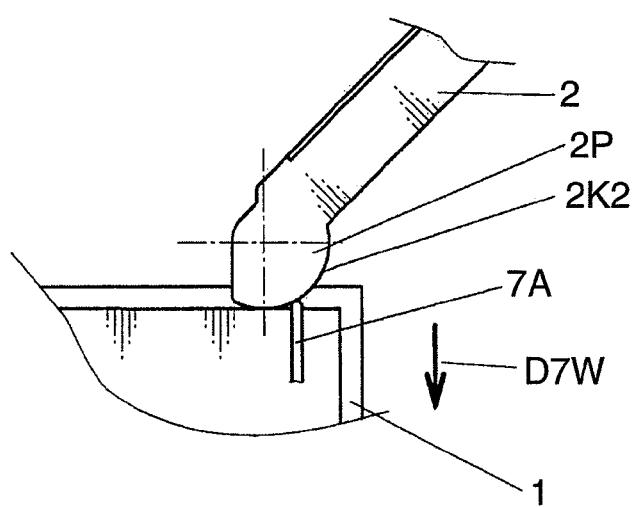
FIG. 24 is a partly enlarged view of the disk apparatus shown in FIG. 23.

FIGS. 23 and 24 show that the lid body 2 opens still further in the direction of the arrow D1A from the apparatus body 1 and swings up to the angle A12 of 135 degrees to the apparatus body 1. In this state, the user can easily operate the main-power switch 1SA and the operation-switch group 1SB as well as view the display 2B in the disk apparatus 100 according to this embodiment. With the state of FIGS. 21 and 22 unchanged, the second press surface 2K2 keeps the ejection-stopper press portion 7A pressed in the direction of the arrow D7W. This continues hindering the lock slider 4 from sliding in the direction of the arrow D2A.

Figure 25:
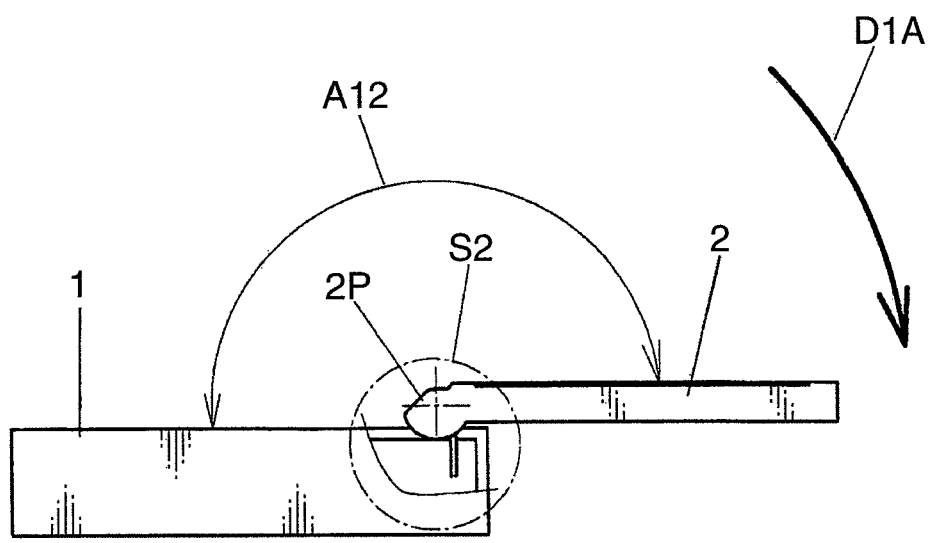
FIG. 25 is a side view showing the lid body at an angle of 180 degrees to the unit body in the disk apparatus of FIG. 1.
Figure 26:
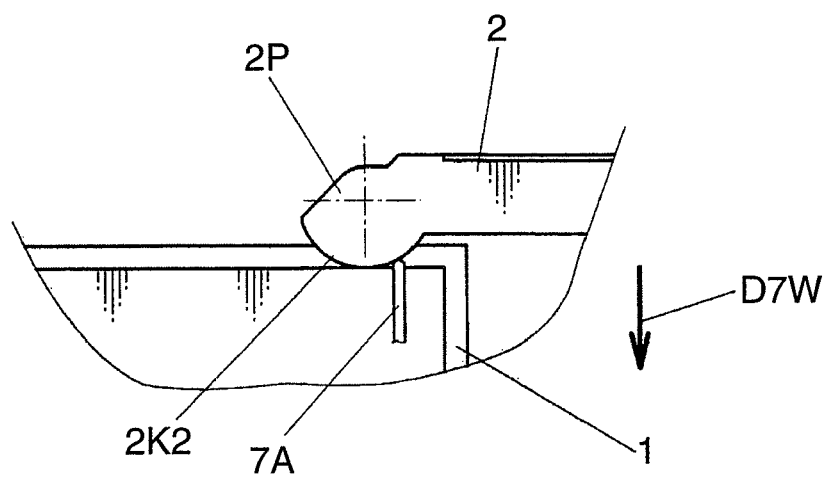
FIG. 26 is a partly enlarged view of the disk apparatus shown in FIG. 25.

FIGS. 25 and 26 show that the lid body 2 opens to the maximum in the direction of the arrow D1A from the apparatus body 1 and lies at the angle A12 of 180 degrees to the apparatus body 1. As shown in FIGS. 25 and 26, the lid body 2 can be opened up to the place where the angle A12 becomes 180 degrees. In this state alike, with the state of FIGS. 23 and 24 unchanged, the second press surface 2K2 keeps the ejection-stopper press portion 7A pressed in the direction of the arrow D7W. This continues hindering the lock slider 4 from sliding in the direction of the arrow D2A.

As described so far, as the lid body 2 opens from the apparatus body 1, the ejection-stopper press portion 7A is forced in the direction of the arrow D7W to thereby hinder the lock slider 4 from sliding in the direction of the arrow D2A. This helps prevent the drive-portion cover 3 from opening.

Therefore, in this embodiment, the display 2B as the display surface of the lid body 2 should preferably be closed face down in such a way that the lid body 2 lies at a narrower angle than 45 degrees to the apparatus body 1. More desirably, it should be less than 30 degrees, and far more desirably, below 15 degrees. In such a state, it is difficult for the user to operate the main-power switch 1SA and the operation-switch group 1SB as well as view the display 2B in the disk apparatus 100. Thus, it can be thought that the user has already turned off the power of the disk apparatus 100 and is not now making a recording and a reproduction for the disk medium 31 in the disk drive portion 11. In other words, it is highly expected that the user is trying to exchange the disk medium 31 by sliding the lock slider 4 and opening the drive-portion cover 3.

On the other hand, the display 2B as the display surface of the lid body 2 should preferably be opened face up in such a way that the lid body 2 lies at an angle of 45 or more degrees to the apparatus body 1. More desirably, it should be 90 degrees or wider, and far more desirably, 135 degrees or above. In such a state, the user can operate the main-power switch 1SA and the operation-switch group 1SB as well as view the display 2B in the disk apparatus 100. Thus, the user is highly likely to be making a recording and a reproduction for the disk medium 31 in the disk drive portion 11. In this situation, it is highly expected that the disk medium 31 needs to be prevented from flying out or from being exposed while rotating when the user makes an error in operation.

In this embodiment, such an apparatus is provided with a type of disk housed in a cartridge as the medium. However, for example, in FIG. 7, the drive-portion cover 3 may also be further opened in such a way that the disk drive portion 11 is largely exposed. In that case, even if an apparatus is provided with a disk placed as a single unit on the disk motor 11M, the same advantages can be obtained.

Furthermore, in this embodiment, a helical extension spring is used as the slider spring 6. However, for example, even if a torsion coil spring or another means is employed, the same advantages can be obtained, as long as the lock slider 4 can be given a force in the direction of the arrow D2B.

Moreover, in this embodiment, a torsion coil spring is used as the ejection-stopper spring 8. However, for example, even if a helical extension spring or another means is employed, the same advantages can be obtained, as long as the ejection stopper 7 can be given a force in the direction of the arrow D7A.

In addition, in this embodiment, a compression coil spring is used as the overload prevention spring 9. However, for example, even if a helical extension spring or another means is employed, the same advantages can be obtained, as long as the lock slider 4 can be given a force in the direction of the arrow D2A against the slide knob 5.

Furthermore, in this embodiment, the configuration for swinging the drive-portion cover 3 in the direction of the arrow D4A is used as the configuration for opening it. However, so long as a disk medium can be inserted and ejected, for example, it may move and open in parallel to the direction of an arrow D14A shown in FIG. 7 and move and close in parallel to the direction of an arrow D14B after a disk medium is inserted. Thereby, the same advantages can be obtained.

(Second Embodiment)

Next, a disk apparatus according to a second embodiment of the present invention will be described with reference to FIGS. 27 to 32.

Figure 27:
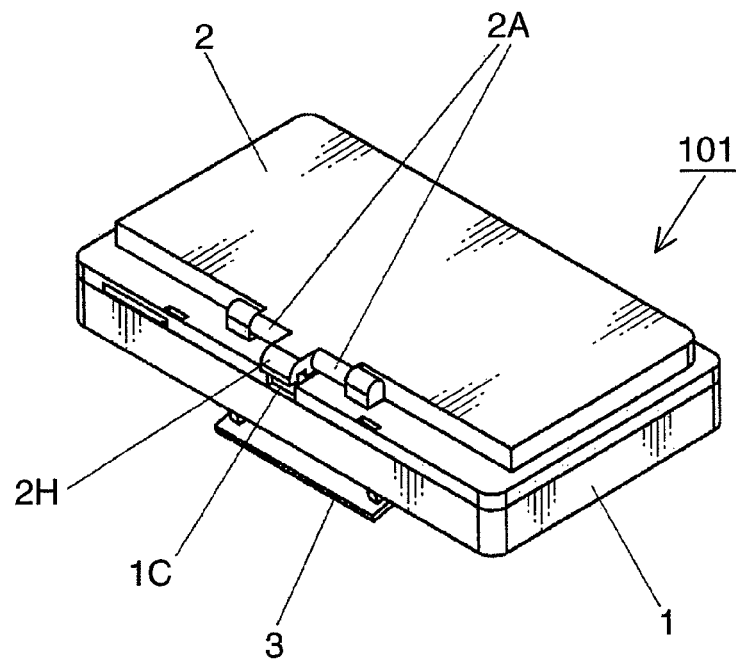
FIG. 27 is a perspective view showing an opening blocking configuration of a drive-portion cover in a disk apparatus according to a second embodiment of the present invention.
Figure 28:
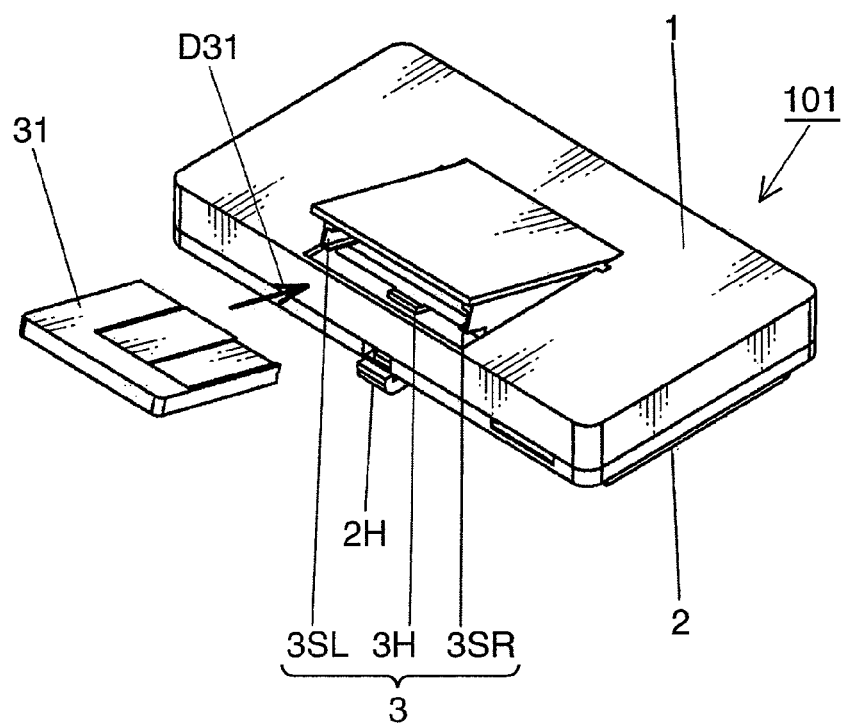
FIG. 28 is a perspective view on the bottom side of the disk apparatus shown in FIG. 27.
Figure 29:
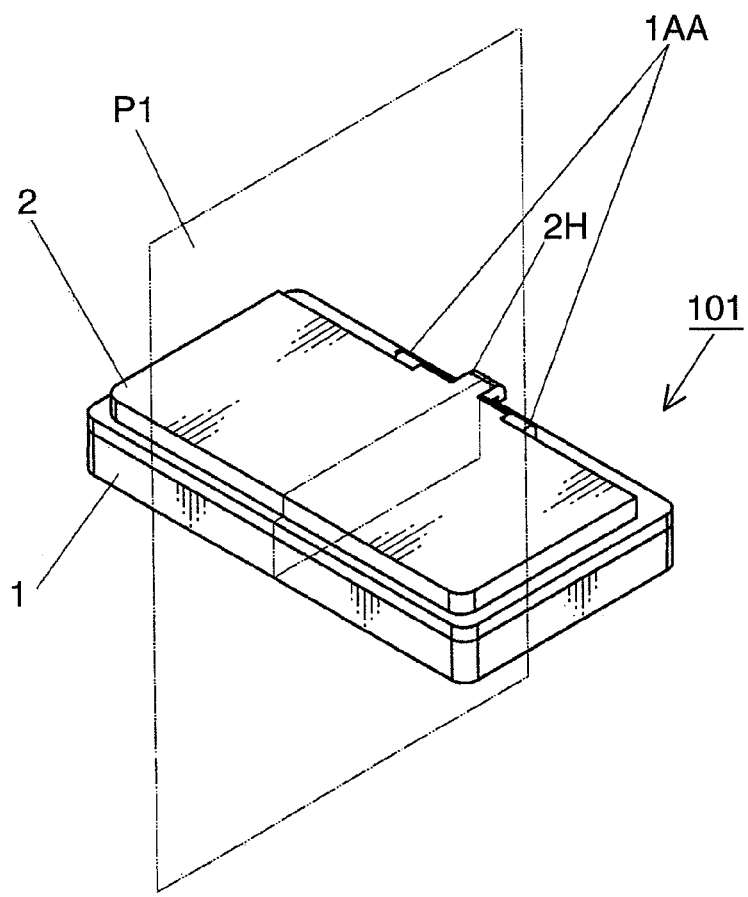
FIG. 29 is a perspective view showing the disk apparatus of FIG. 27 in a closed state.
Figure 30:
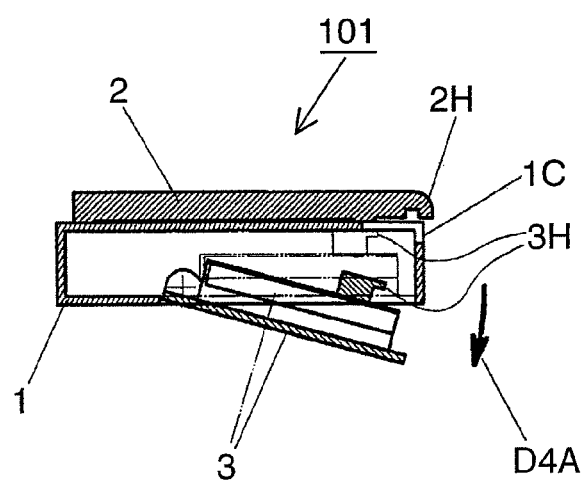
FIG. 30 is a sectional view of the disk apparatus shown in FIG. 29.
Figure 31:
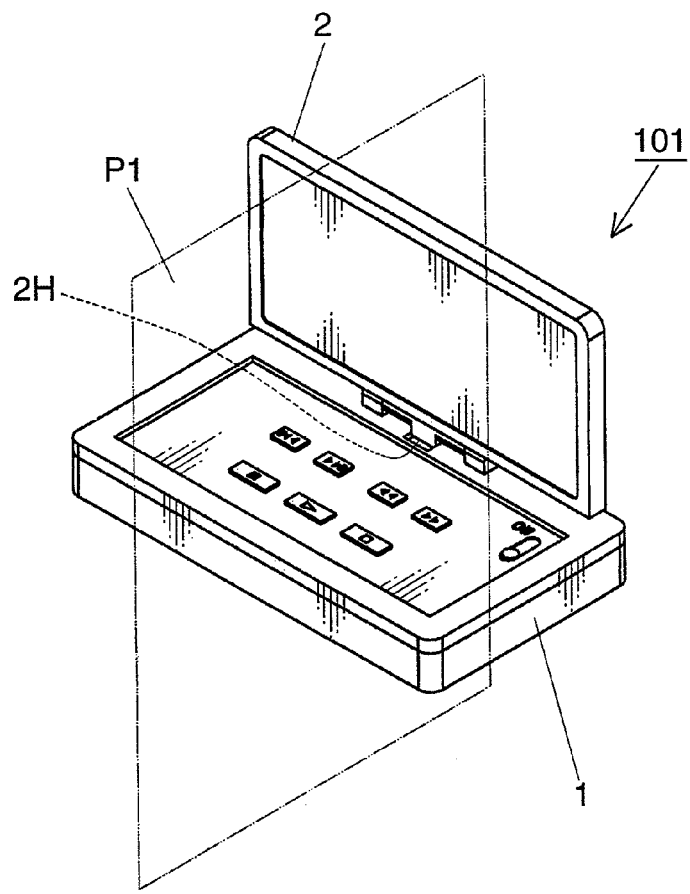
FIG. 31 is a perspective view showing the disk apparatus of FIG. 27 in an open state.
Figure 32:
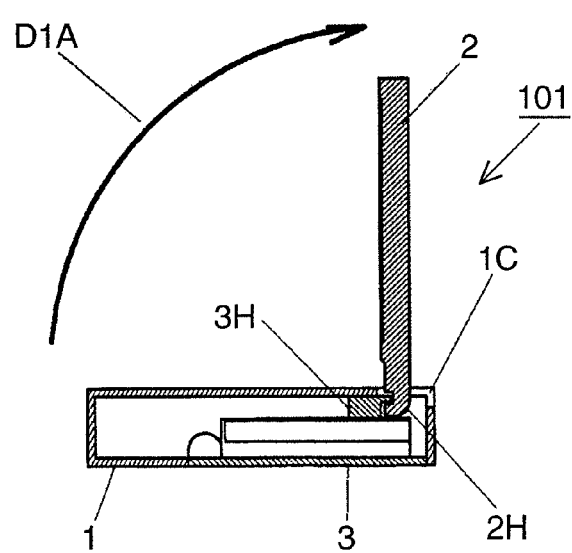
FIG. 32 is a sectional view of the disk apparatus shown in FIG. 31.

FIGS. 27 and 28 each show an external appearance of a disk apparatus 101 provided with a blocking hook 2H according to this embodiment. FIGS. 29 and 30 each show a relative positional relationship in exterior view between the blocking hook 2H and a fixation hook 3H. FIG. 29 shows the entire apparatus seen at a different angle from FIG. 27. FIG. 31 shows the lid body 2 opened from the state of FIG. 29. FIGS. 30 and 32 are each a schematic sectional view on a plane P1 of the whole apparatus shown in FIGS. 29 and 31, respectively.

As shown in FIG. 28, the disk medium 31 is inserted in the direction of the arrow D31 along the cartridge guides 3SL and 3SR. Thereby, the disk apparatus 101 according to this embodiment can also be used in the same way as the first embodiment. However, the disk apparatus 101 according to this embodiment is different from the first embodiment as follows. As shown in FIGS. 27 to 32, the lid body 2 is designed to directly prevent the drive-portion cover 3 from opening when the lid body 2 is kept open.

In FIGS. 27 to 32, the blocking hook 2H prevents the drive-portion cover 3 from opening when the lid body 2 is kept open. The fixation hook 3H corresponds to the hooked portion disposed in the drive-portion cover 3 and is hooked by the blocking hook 2H as the hooking portion.

As shown in FIGS. 27 to 32, the blocking hook 2H protrudes from a middle part of the swing hinge portion 2A of the lid body 2. It comes into a passage hole 1C formed in the apparatus body 1 when the lid body 2 opens in the direction of the arrow D1A. The fixation hook 3H is united with a bridge part between the two cartridge guides 3SL and 3SR of the drive-portion cover 3.

As shown in FIGS. 29 and 30, the fixation hook 3H is not under restraint when the lid body 2 is kept closed, so that the drive-portion cover 3 can be freely opened in the direction of the arrow D4A. On the other hand, as shown in FIGS. 31 and 32, if the lid body 2 opens with the drive-portion cover 3 kept closed, the blocking hook 2H hooks the fixation hook 3H to thereby prevent the drive-portion cover 3 from opening.

As described above, in the disk apparatus 101 according to this embodiment, the drive-portion cover 3 is hindered from opening while the lid body 2 is open, in other words, while the disk apparatus 101 is in operation. Therefore, similarly to the first embodiment, the disk medium 31 is not supposed to be accidentally taken out while a reproduction or a recording is being made for the disk 31D. Consequently, the rotating disk 31D can be prevented from flying out at the user, or a laser beam from a semiconductor laser can be kept from entering the eyes of the user. This helps keep the user safer.

Herein, in the above described first and second embodiments, as can be seen in FIG. 7 or FIG. 27, the swing center axis on which the drive-portion cover 3 opens and closes with respect to the apparatus body 1 is parallel to the swing center axis on which the lid body 2 opens and closes. At the same time, the swing directions in which the drive-portion cover 3 and the lid body 2 open are both clockwise around the swing centers and have a front and back side relation to each other, for example, if the disk apparatus 100 is seen from the right-hand side in the state of FIG. 7. However, the present invention is not limited to this configuration.

Figure 33:
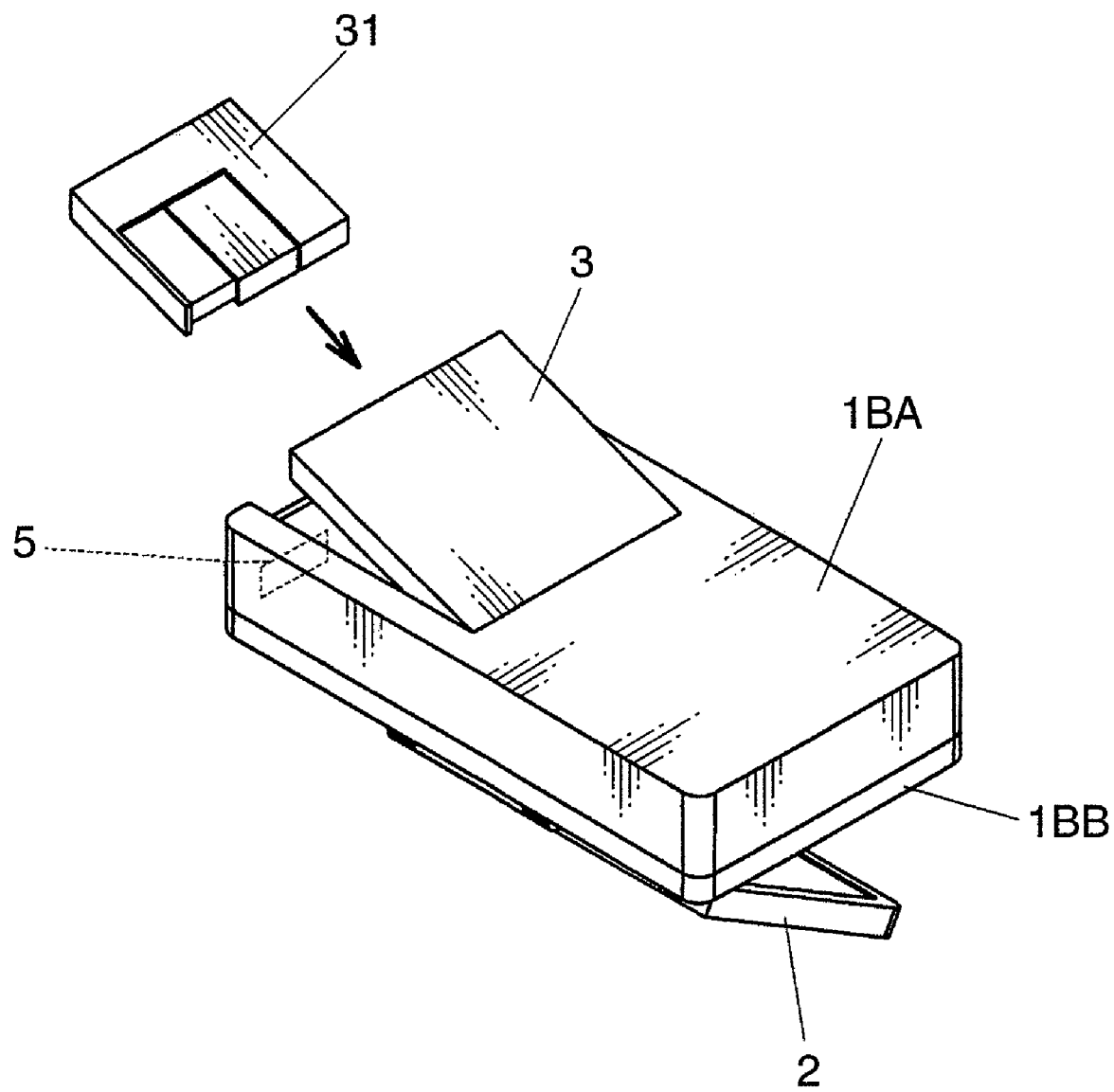
FIG. 33 is a perspective view showing a first variation of the disk apparatus according to the present invention.
Figure 34:
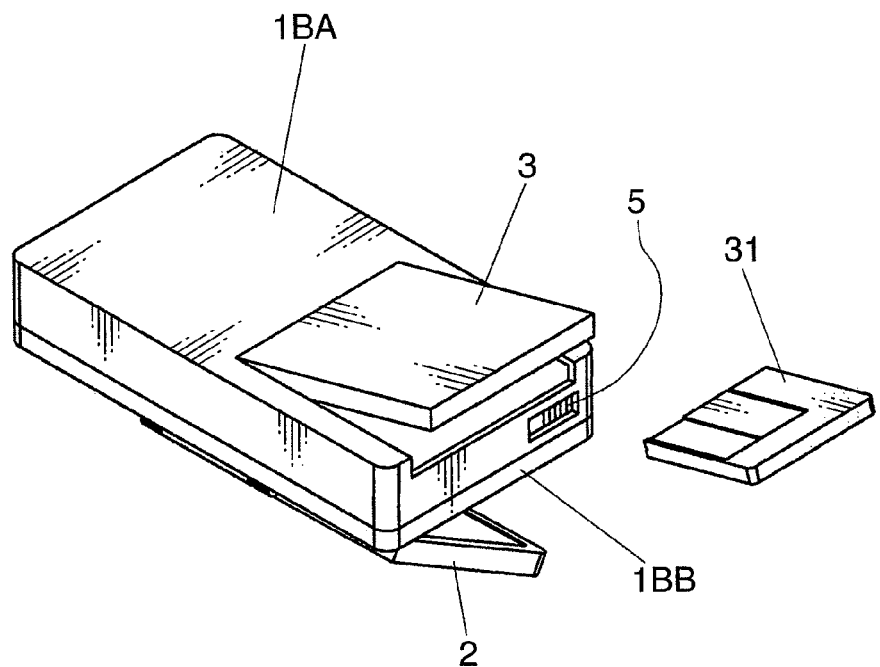
FIG. 34 is a perspective view showing a second variation of the disk apparatus according to the present invention.
Figure 35:
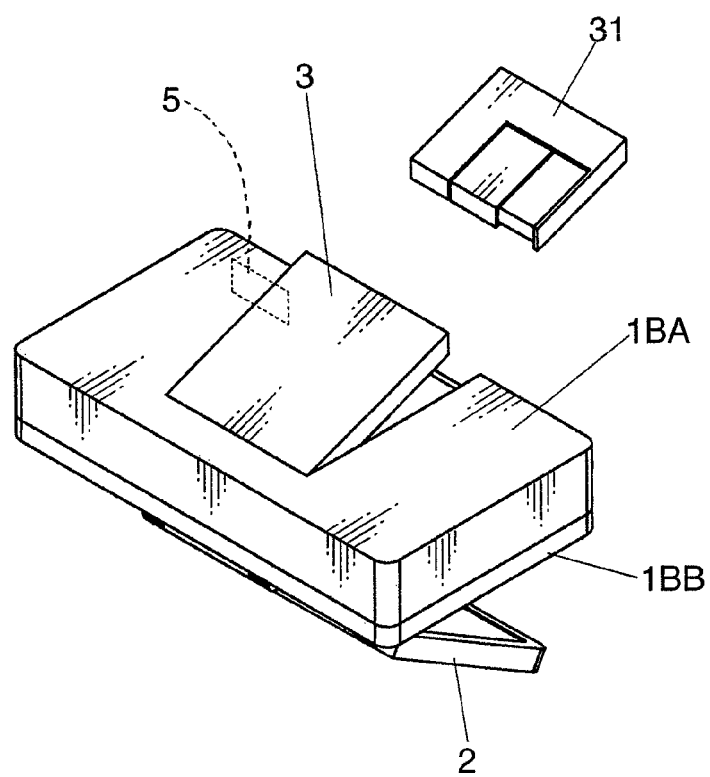
FIG. 35 is a perspective view showing a third variation of the disk apparatus according to the present invention.
Figure 36:
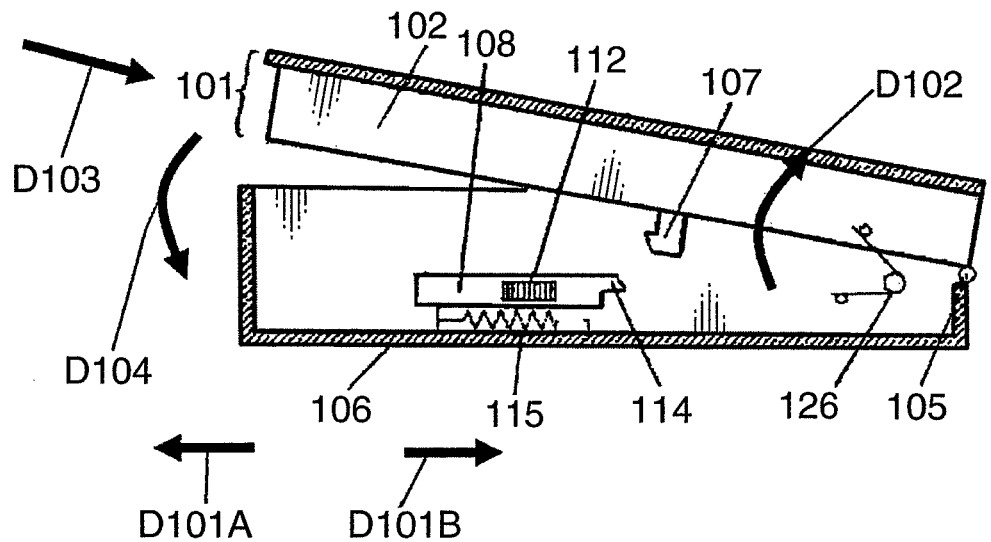
FIG. 36 is a side view of a conventional disk unit in an open state.
Figure 37:
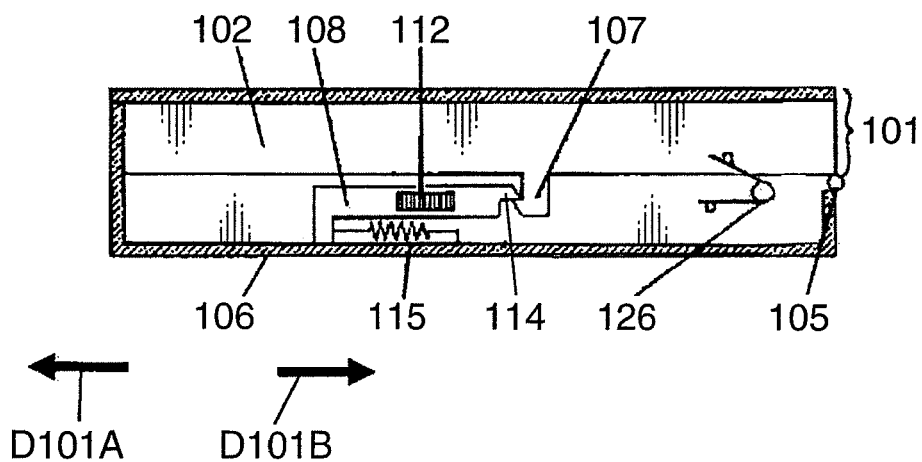
FIG. 37 is a side view of the conventional disk unit in a closed state.
Figure 38:
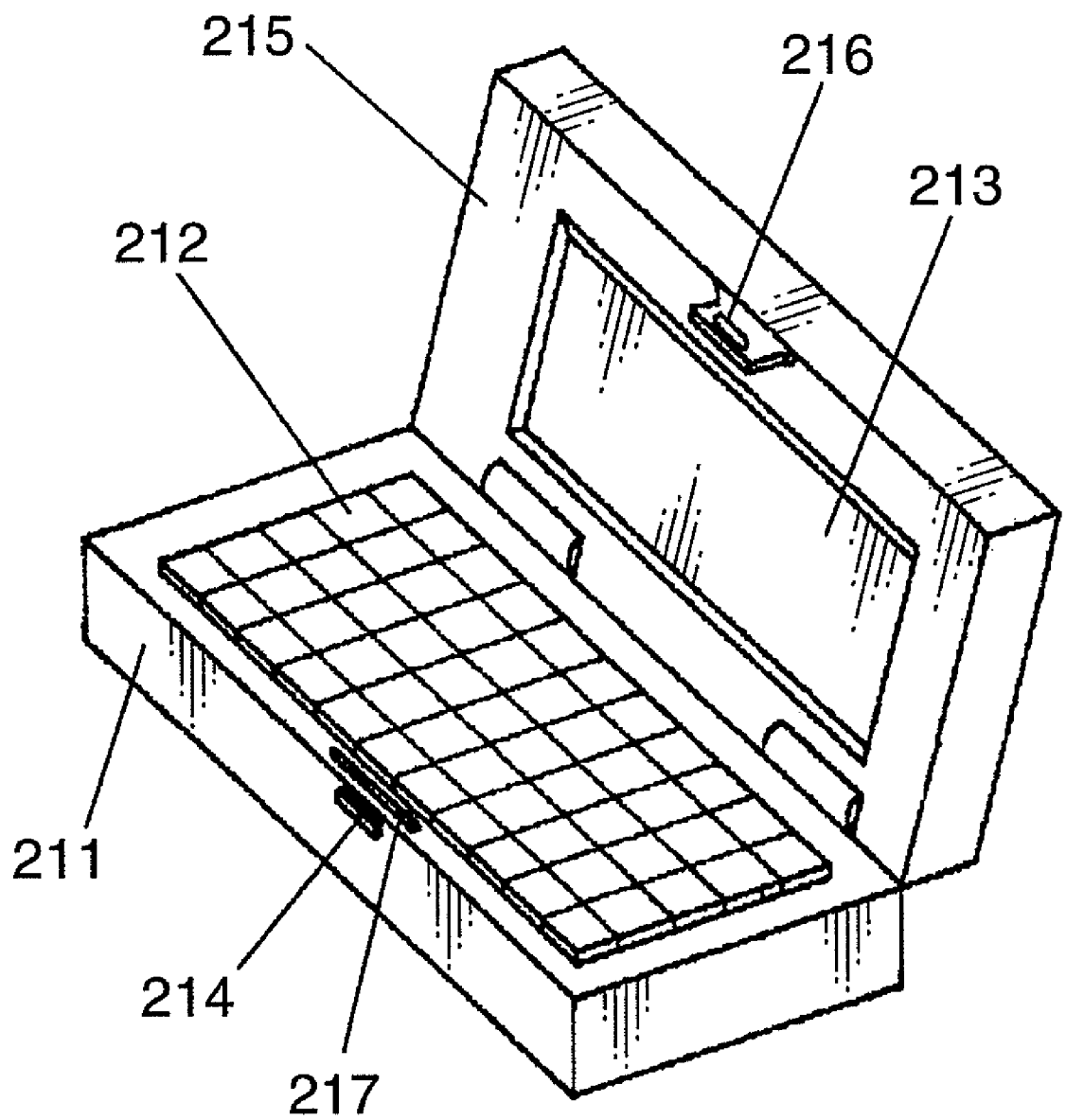
FIG. 38 is a schematic perspective view showing a whole configuration of a conventional portable terminal.

For example, as shown in FIG. 33 or FIG. 34, the swing center axis of the drive-portion cover 3 has a twist relation to the swing center axis of the lid body 2. Further, as shown in FIG. 35, the swing center axis of the drive-portion cover 3 may be parallel to the swing center axis of the lid body 2. At the same time, the swing direction in which the drive-portion cover 3 opens may be counterclockwise around the swing center, if a disk apparatus is seen from the right-hand side in the state of FIG. 35. Likewise in this case, the same advantages can be obtained. In each disk apparatus shown in FIG. 33 to FIG. 35, no description is given about a configuration of a lock mechanism or the like for keeping the drive-portion cover 3 closed to the body lower case 1BA. But any configuration equivalent to that of the already described first or second embodiment can be employed.

On the basis of each embodiment described so far, the present invention is summarized as follows. Specifically, a disk apparatus according to the present invention includes: a body unit including a disk drive for housing a disk-shaped information recording medium having an information recording surface and for recording and/or reproducing information; and a display unit including a display surface for displaying information, and closed and opened with respect to the body unit in such a way that the display surface is postured face down and up, in which: the body unit includes a disk insertion-and-ejection mechanism which is movable in a bottom direction of the body unit and inserts and ejects the information recording medium into and from the disk drive, and a lock mechanism locking the information recording medium housed in the body unit; and a locking state of the lock mechanism is maintained when the display unit is in the open state with respect to the body unit.

In this disk apparatus, when the display unit is opened with respect to the body unit, the lock mechanism keeps the disk insertion-and-ejection mechanism in a state where the disk-shaped information recording medium cannot be inserted and ejected. Hence, the information recording medium is not supposed to be taken out while the disk drive is making a recording or a reproduction for the information recording medium. This makes it possible to prevent the information recording medium from flying out or being exposed while rotating. Besides, an operation of the lock mechanism interlocks with a relative movement of the display unit with respect to the body unit. Thus, using a simple configuration, the locking state can be automatically maintained as the display unit opens.

It is preferable that the locking state of the lock mechanism be released only when the display unit is in the closed state with respect to the body unit.

In this case, the locking state of the lock mechanism is released only when the display unit is in the closed state with respect to the body unit. Therefore, the user can take out the information recording medium only when the user is not using this disk apparatus. This makes it possible to certainly prevent the information recording medium from flying out or being exposed while rotating.

It is preferable that: the display unit be held so as to swing on the body unit; and the disk insertion-and-ejection mechanism be disposed on a bottom-surface side of the body unit opposite to a surface thereof on which the display unit is disposed, and be held so as to swing in the bottom direction on the body unit.

In this case, the disk insertion-and-ejection mechanism is disposed on a bottom-surface side of the body unit. This makes it easier for the information recording medium to fly out because of its weight from the disk insertion-and-ejection mechanism. In this state, however, the information recording medium can be prevented from flying out or being exposed while rotating.

It is preferable that the lock mechanism include: a hooking portion disposed in a slider held so as to slide on the body unit; a hooked portion disposed in the disk insertion-and-ejection mechanism and hooked on the hooking portion; and a slider spring giving a force to the slider in parallel to a direction where the slider slides and in a direction where the hooking portion hooks the hooked portion.

In this case, the lock mechanism for keeping the disk insertion-and-ejection mechanism in a state where the disk-shaped information recording medium cannot be inserted and ejected is formed by the hooking portion and the hooked portion. Then, the slider spring is provided which gives a force to the slider in a direction where the hooking portion hooks the hooked portion. This helps maintain the locking state securely and release it easily.

It is preferable that: the body unit further include a lock retention member stopping the slider from moving in a direction where the hooking portion unhooks the hooked portion, and an unlocking spring changing the lock retention member from a stop state where the slider is stopped from moving to a nonstop state where the slider is not stopped from moving in such a way that the locking state of the lock mechanism is released; and when the display unit changes from the closed state to the open state, the lock retention member interlock with an opening operation of the display unit and change from the nonstop state to the stop state, and when the display unit changes from the open state to the closed state, the unlocking spring allow the lock retention member to change from the stop state to the nonstop state.

In this case, the lock retention member hooks and stops a part of the slider. Therefore, using a simple configuration, the disk insertion-and-ejection mechanism can be kept locked firmly on the body unit.

It is preferable that: the body unit further include an operation member having a manual operation portion exposed outside of the body unit, and a connection spring connecting the operation member to the slider between the slider and the operation member; and the connection spring have a greater force than the slider spring.

In this case, even if the user moves the manual operation portion by force in the unlocking direction with the disk insertion-and-ejection mechanism kept locked on the body unit, this act is not supposed to overload the whole system of the lock mechanism. Hence, the lock mechanism can be prevented from being damaged.

It is preferable that: the lock retention member include a protrusion portion protruding from the surface of the body unit on the side where the display unit is held so as to swing, and a hook-stopping portion stopping the slider from moving by coming into contact with the slider; and an edge of the display unit interlock with an opening operation of the display unit by pushing the protrusion portion into the body unit to thereby bring the hook-stopping portion into contact with the slider and stop the slider from moving, and the protrusion portion interlock with a closing operation of the display unit by protruding from the surface of the body unit to thereby separate the hook-stopping portion from the slider and permit the slider to move.

In this case, the state of the disk apparatus can be automatically set in such a way that the disk insertion-and-ejection mechanism is kept locked on the body unit by interlocking with an opening operation of the display unit by the user. Simultaneously, the state of the disk apparatus can be automatically set in such a way that the disk insertion-and-ejection mechanism is unlocked from the body unit by interlocking with a closing operation of the display unit by the user. Therefore, when the display unit is kept open because the user uses the disk apparatus, the information recording medium can be certainly prevented from flying out or being exposed while rotating because the user operates it by mistake. On the other hand, the locking state can be released when the display unit is kept closed because the user exchanges the information recording medium. Hence, the operability by the user is not supposed to be deteriorated.

It is preferable that: the lock mechanism include a hooking portion disposed in the display unit, and a hooked portion disposed in the disk insertion-and-ejection mechanism and hooked on the hooking portion of the display unit; and the hooking portion of the display unit interlock with an opening operation of the display unit and hook the hooked portion of the disk insertion-and-ejection mechanism to thereby prohibit the disk insertion-and-ejection mechanism from opening, and the hooking portion of the display unit interlock with a closing operation of the display unit and unhook the hooked portion of the disk insertion-and-ejection mechanism to thereby permit the disk insertion-and-ejection mechanism to open.

In this case, when the display unit is kept open because the user uses the disk apparatus, the disk insertion-and-ejection mechanism can be prohibited from opening. On the other hand, when the display unit is kept closed because the user exchanges the information recording medium, the disk insertion-and-ejection mechanism can be permitted to open. Therefore, using a simple configuration and without deteriorating the operability by the user, the information recording medium can be certainly prevented from flying out or being exposed while rotating because the user operates it by mistake.

It is preferable that: the information recording medium be an optical disk; and the disk drive apply a laser beam to the optical disk when a recording and/or a reproduction is made for the optical disk.

In this case, the disk insertion-and-ejection mechanism can be prevented from opening by accident with a laser emitting a beam while the apparatus is in operation. This helps prevent a light beam emitted by a laser or the like from being exposed. Hence, the safer disk apparatus can be offered to the user.

It is preferable that: the body unit further include a main-power switch disposed on a surface thereof on the side of the display unit; and the display unit conceal the main-power switch in the closed state in such a way that the main-power switch is inoperable by a user.

In this case, when the display unit is kept closed, the user cannot turn on the main-power switch. Therefore, the user can be prevented from turning on the power of the apparatus by mistake when exchanging the information recording medium.

It is preferable that: the body unit further include a power cut-off switch for cutting off all power supplies; and the power cut-off switch interlock with a closing operation of the display unit and turn on to thereby cut off all power supplies.

In this case, all power supplies are automatically cut off by interlocking with a closing operation of the display unit. Therefore, the user can be certainly prevented from turning on the power of the apparatus by mistake when exchanging the information recording medium.

A disk drive unit according to the present invention which is used in a disk apparatus including a body unit, and a display unit having a display surface for displaying information and closed and opened with respect to the body unit in such a way that the display surface is postured face down and up, includes: a disk drive for housing a disk-shaped information recording medium having an information recording surface and recording and/or reproducing information; and a disk insertion-and-ejection mechanism which: is disposed on a bottom-surface side of the body unit opposite to a surface thereof on which the display unit is disposed; is movable in a bottom direction of the body unit; and inserts and ejects the information recording medium into and from the disk drive, in which a hooking portion of the display unit interlocks with an opening operation of the display unit and hooks a hooked portion of the disk insertion-and-ejection mechanism to thereby prohibit the disk insertion-and-ejection mechanism from opening, and the hooking portion of the display unit interlocks with a closing operation of the display unit and unhooks the hooked portion of the disk insertion-and-ejection mechanism to thereby permit the disk insertion-and-ejection mechanism to open.

In this disk drive unit, when the display unit is kept open because the user uses the disk apparatus, the disk insertion-and-ejection mechanism can be prohibited from opening. On the other hand, when the display unit is kept closed because the user exchanges the information recording medium, the disk insertion-and-ejection mechanism can be permitted to open. Therefore, using a simple configuration and without deteriorating the operability by the user, the information recording medium can be certainly prevented from flying out or being exposed while rotating because the user operates it by mistake.

The disk apparatus according to the present invention is capable of preventing the disk-shaped information recording medium from flying out accidentally while the apparatus is in operation. Therefore, it is suitable for a disk apparatus including a disk drive capable of recording and/or reproducing information using a disk-shaped information recording medium. Particularly, it is suitable for a potable apparatus usable for a disk-shaped information recording medium.

This application is based on Japanese patent application serial No. 2007-123187, filed in Japan Patent Office on May 8, 2007, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A disk apparatus, comprising:
   a body unit including a disk drive for housing a disk-shaped information recording medium having an information recording surface and for recording and/or reproducing information; and
   a display unit including a display surface for displaying information, and closed and opened with respect to the body unit in such a way that the display surface is postured face down and up, wherein:

the body unit further includes a disk insertion-and-ejection mechanism which is movable in a bottom direction of the body unit and inserts and ejects the information recording medium into and from the disk drive, and a lock mechanism locking the information recording medium housed in the body unit;

a locking state of the lock mechanism is maintained when the display unit is in the open state with respect to the body unit; and wherein the locking state of the lock mechanism is released only when the display unit is in the closed state with respect to the body unit.

2. The disk apparatus according to claim 1, wherein:
the display unit is held so as to swing on the body unit; and
the disk insertion-and-ejection mechanism is disposed on a bottom-surface side of the body unit opposite to a surface thereof on which the display unit is disposed, and is held so as to swing in the bottom direction on the body unit.

3. The disk apparatus according to claim 1, wherein:
the information recording medium is an optical disk; and
the disk drive applies a laser beam to the optical disk when a recording and/or a reproduction is made for the optical disk.

4. The disk apparatus according to claim 1, wherein:
the body unit further includes a main-power switch disposed on a surface thereof on the side of the display unit; and
the display unit conceals the main-power switch in the closed state in such a way that the main-power switch is inoperable by a user.

5. The disk apparatus according to claim 1, wherein:
the body unit further includes a power cut-off switch for cutting off all power supplies; and
the power cut-off switch interlocks with a closing operation of the display unit and turns on to thereby cut off all power supplies.

6. A disk apparatus, comprising:
a body unit including a disk drive for housing a disk-shaped information recording medium having an information recording surface and for recording and/or reproducing information; and
a display unit including a display surface for displaying information, and closed and opened with respect to the body unit in such a way that the display surface is postured face down and up, wherein:
the body unit further includes a disk insertion-and-ejection mechanism which is movable in a bottom direction of the body unit and inserts and ejects the information recording medium into and from the disk drive, and a lock mechanism locking the information recording medium housed in the body unit;
a locking state of the lock mechanism is maintained when the display unit is in the open state with respect to the body unit; and
the lock mechanism includes: a hooking portion disposed in a slider held so as to slide on the body unit; a hooked portion disposed in the disk insertion-and-ejection mechanism and hooked on the hooking portion; and a slider spring giving a force to the slider in parallel to a direction where the slider slides and in a direction where the hooking portion hooks the hooked portion.

7. The disk apparatus according to claim 6, wherein:
the body unit further includes a lock retention member stopping the slider from moving in a direction where the hooking portion unhooks the hooked portion, and an unlocking spring changing the lock retention member from a stop state where the slider is stopped from moving to a nonstop state where the slider is not stopped from moving in such a way that the locking state of the lock mechanism is released; and
when the display unit changes from the closed state to the open state, the lock retention member interlocks with an opening operation of the display unit and changes from the nonstop state to the stop state, and when the display unit changes from the open state to the closed state, the unlocking spring allows the lock retention member to change from the stop state to the nonstop state.

8. The disk apparatus according to claim 7, wherein:
the body unit further includes an operation member having a manual operation portion exposed outside of the body unit, and a connection spring connecting the operation member to the slider between the slider and the operation member; and
the connection spring has a greater force than the slider spring.

9. The disk apparatus according to claim 7, wherein:
the lock retention member includes a protrusion portion protruding from the surface of the body unit on the side where the display unit is held so as to swing, and a hook-stopping portion stopping the slider from moving by coming into contact with the slider; and
an edge of the display unit interlocks with an opening operation of the display unit by pushing the protrusion portion into the body unit to thereby bring the hook-stopping portion into contact with the slider and stop the slider from moving, and the protrusion portion interlocks with a closing operation of the display unit by protruding from the surface of the body unit to thereby separate the hook-stopping portion from the slider and permit the slider to move.

10. A disk apparatus, comprising:
a body unit including a disk drive for housing a disk-shaped information recording medium having an information recording surface and for recording and/or reproducing information; and
a display unit including a display surface for displaying information, and closed and opened with respect to the body unit in such a way that the display surface is postured face down and up, wherein:
the body unit further includes a disk insertion-and-ejection mechanism which is movable in a bottom direction of the body unit and inserts and ejects the information recording medium into and from the disk drive, and a lock mechanism locking the information recording medium housed in the body unit;
a locking state of the lock mechanism is maintained when the display unit is in the open state with respect to the body unit;
the lock mechanism includes a hooking portion disposed in the display unit, and a hooked portion disposed in the disk insertion-and-ejection mechanism and hooked on the hooking portion of the display unit; and
the hooking portion of the display unit interlocks with an opening operation of the display unit and hooks the hooked portion of the disk insertion-and-ejection mechanism to thereby prohibit the disk insertion-and-ejection mechanism from opening, and the hooking portion of the display unit interlocks with a closing operation of the display unit and unhooks the hooked portion of the disk insertion-and-ejection mechanism to thereby permit the disk insertion-and- ejection mechanism to open.

11. A disk drive unit which is used in a disk apparatus including a body unit, and a display unit having a display surface for displaying information and closed and opened with respect to the body unit in such a way that the display surface is postured face down and up, comprising:
- a disk drive for housing a disk-shaped information recording medium having an information recording surface and recording and/or reproducing information; and
- a disk insertion-and-ejection mechanism which: is disposed on a bottom-surface side of the body unit opposite to a surface thereof on which the display unit is disposed; is movable in a bottom direction of the body unit; and inserts and ejects the information recording medium into and from the disk drive, wherein a hooking portion of the display unit interlocks with an opening operation of the display unit and hooks a hooked portion of the disk insertion-and-ejection mechanism to thereby prohibit the disk insertion-and-ejection mechanism from opening, and the hooking portion of the display unit interlocks with a closing operation of the display unit and unhooks the hooked portion of the disk insertion-and-ejection mechanism to thereby permit the disk insertion-and- ejection mechanism to open.

\* \* \* \* \*